(12) United States Patent
Esparza

(10) Patent No.: US 9,805,703 B2
(45) Date of Patent: *Oct. 31, 2017

(54) SYSTEMS AND METHODS FOR CAPTURING AND INTERPRETING AUDIO

(71) Applicant: Sunhouse Technologies, Inc., New York, NY (US)

(72) Inventor: Tlacaelel Miguel Esparza, Ridgewood, NY (US)

(73) Assignee: Sunhouse Technologies, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,840

(22) Filed: Dec. 21, 2016

(65) Prior Publication Data

US 2017/0103743 A1     Apr. 13, 2017

Related U.S. Application Data

(63) Continuation of application No. 14/866,169, filed on Sep. 25, 2015, now Pat. No. 9,536,509.

(60) Provisional application No. 62/055,024, filed on Sep. 25, 2014, provisional application No. 62/055,037, (Continued)

(51) Int. Cl.
| | |
|---|---|
| *G10H 7/00* | (2006.01) |
| *G10H 3/14* | (2006.01) |
| *G10D 13/02* | (2006.01) |
| *G10H 1/14* | (2006.01) |

(52) U.S. Cl.
CPC ........... *G10H 3/146* (2013.01); *G10D 13/024* (2013.01); *G10H 1/14* (2013.01); *G10H 7/008* (2013.01); *G10H 2210/051* (2013.01); *G10H 2210/281* (2013.01)

(58) Field of Classification Search
CPC .. G10H 3/146; G10H 3/143; G10H 2220/525; G10H 2230/281; G10H 2250/435; G10H 2250/641; G10H 2210/041; G10H 2210/051;
(Continued)

(56) References Cited

U.S. PATENT DOCUMENTS

| | | | |
|---|---|---|---|
| 7,408,109 B1* | 8/2008 | Freitas | G10H 3/12 84/687 |
| 7,473,840 B2* | 1/2009 | Arimoto | G10H 1/06 84/615 |
| 9,263,020 B2* | 2/2016 | Takasaki | G10H 3/146 |

(Continued)

*Primary Examiner* — Jeffrey Donels
(74) *Attorney, Agent, or Firm* — Myers Wolin, LLC

(57) ABSTRACT

A device is provided as part of a system, the device being for capturing vibrations produced by an object such as a musical instrument. Via a fixation element, the device is fixed to a drum. The device has a sensor spaced apart from a surface of the drum, located relative to the drum, and a magnet adjacent the sensor. The fixation element transmits vibrations from its fixation point on the drum to the magnet. Vibrations from the surface of the drum and from the magnet are transmitted to the sensor. A method may further be provided for interpreting an audio input, such as the output of the sensors within the system, the method comprising identifying an audio event or grouping of audio events within audio data, generating a model of the audio event that includes a representation of a timbre characteristic, and comparing that representation to expected representations.

22 Claims, 32 Drawing Sheets

Related U.S. Application Data filed on Sep. 25, 2014, provisional application No. 62/193,233, filed on Jul. 16, 2015.

(58) Field of Classification Search
CPC ....... G10H 2220/091; G10H 2250/235; G10H 2250/311
USPC .......................................................... 84/603
See application file for complete search history.

(56) References Cited

U.S. PATENT DOCUMENTS

| | | | |
|---|---|---|---|
| 2001/0044719 A1* | 11/2001 | Casey | G10L 15/02 704/245 |
| 2004/0134332 A1* | 7/2004 | Kamijima | G10H 3/146 84/411 R |
| 2005/0150366 A1* | 7/2005 | Susami | G10H 3/146 84/735 |
| 2010/0105326 A1* | 4/2010 | Hsien | G10H 3/146 455/41.2 |
| 2013/0272548 A1* | 10/2013 | Visser | G06K 9/00624 381/122 |
| 2014/0208926 A1* | 7/2014 | Shepherd | G10D 13/021 84/730 |
| 2014/0216234 A1* | 8/2014 | Wei | G10D 13/024 84/723 |
| 2014/0270216 A1* | 9/2014 | Tsilfidis | H04M 9/082 381/66 |
| 2016/0005387 A1* | 1/2016 | Eronen | G10H 1/40 84/611 |

* cited by examiner

SYSTEMS AND METHODS FOR CAPTURING AND INTERPRETING AUDIO

CROSS-REFERENCE TO RELATED APPLICATIONS

This application is a continuation of U.S. patent application Ser. No. 14/866,169, filed Sep. 25, 2015 which claims the benefit of U.S. Provisional Patent Application No. 62/193,233 filed Jul. 16, 2015, Provisional Patent Application No. 62/055,037, filed Sep. 25, 2014, Provisional Patent Application No. 62/055,024, filed Sep. 25, 2014, the contents of each of which are incorporated by reference herein.

FIELD OF THE INVENTION

The invention relates to capturing and interpreting audio, and for using interpreted audio to control computer systems. Specifically, this disclosure relates to hardware and software components for systems for capturing and synthesizing percussion instruments.

BACKGROUND

Many traditional acoustic musical instruments, such as percussion instruments, cannot be easily emulated or synthesized by electronic systems. While attempts have been made to build electronic drums, such electronic drums do not currently reproduce the sound of acoustic drum kits, and the subtlety of an acoustic performance may be lost by using existing electronic equivalents of drums.

Modern electronic drum kits are typically activated using a set of binary triggers, such that striking an electronic drum pad at a trigger will produce a specific sound. However, an acoustic drum kit can produce a much wider variety of sounds by using the main drum pad as a continuum, rather than a series of discrete triggers, using the rim of the drum as part of the instrument, and by striking a drum with different materials or utilizing different techniques, each activating the acoustics of the physical object in different ways to produce different sounds. For example, drummers may make unique sounds by hitting the rim of a drum or a side of a drum, or other locations where electronic devices may not have triggers. While some electronic drum pads can distinguish between harder and softer hits, they are still limited to which trigger is activated and at what force.

Traditionally, acoustic drum sounds have been captured by standard acoustic microphones that are prone to also detecting ambient sounds other than those emanating from the drums. Such ambient sounds may include unwanted sounds that are difficult to isolate during processing. Further, such microphones may create signals that are usable to recreate the specific audio from the performance captured, but which cannot be used to modify or refine playback of the performance, since such signals are difficult or impossible for a computerized system to interpret. Further, such signals cannot be easily used to control a computer and cause customized playback of audio other than an amplified version of that captured.

Further, existing electronic drum kits require musicians to familiarize themselves with a new set of equipment that looks and feels different from what they are used to. Drummers are typically comfortable with their kit, and they are proficient at executing special drumming techniques on the equipment they have used for years.

The key issue is one of human-computer interaction. Currently, computer interfaces for musicians typically require the use of binary buttons, knobs and controls of limited dimensionality. To use a computer for musical creation requires that you learn the interfaces of the system. Since these interfaces are typically composed of low dimensional input devices, the range of musical expressivity inevitably falls short of what is possible with acoustic instruments. Unlike computer interfaces, acoustic instruments have extraordinarily complex analog interfaces. Take for example a drum: an electronic drum pad may be able to replay a single sound at variable volumes when struck by a performer, but an acoustic drum produces infinitely variable sounds depending on how, where and with what the drum is struck.

Further, current digital instruments and environments are not capable of listening to its users and responding in musically meaningful ways. For instance, a sequencer is capable of being programmed to play back melodies, harmonies and shifting tonalities in time, however, it may not be capable of listening to another musician playing along with it and respond to that musician's intent to change tempo, chords, or tonality in real time.

There is a need for a system that can emulate and synthesize percussion instruments without losing the benefits of the acoustic and analog nature of the original instrument. There is a further need for such a system that can interpret signals captured from such percussion instruments and utilize them to control the output of a computer system. There is a further need for such a system that is adaptable to equipment that percussionists use currently and are comfortable with without the limitations of traditional microphones.

There is a further need for a platform in which the system described may be trained to better recognize signals captured, as well as a platform in which musical information can be extracted from audio data streams acquired elsewhere.

Finally, there is a need for a system that has the capability of interpreting its input as musically relevant information in order to follow, play along with and support other musicians.

SUMMARY

The present disclosure is directed to systems and methods for capturing and interpreting audio, as well as outputting a sounds selected based on the interpretation by the systems and methods. Also disclosed is a device for use in conjunction with the system as well as methods for training such a system.

A device is provided as part of a system, the device being for capturing vibrations produced by an object such as a musical instrument. The device comprises a fixation element, such as a clamping mechanism, for fixing the device to the musical instrument. In the description that follows, the musical instrument is a drum, but devices may be provided for other instruments as well. The device has a sensor placed apart from a surface of the drum and located relative to the head of the drum. The device contains a magnet adjacent the sensor and the fixation element transmits vibrations from a fixation point on the drum, typically the rim of the drum, to the magnet, and the magnet in turn is configured to transmit vibrations from the fixation point and from a surface of the object to the sensor.

The device may be used within a system, and may output a single signal from the sensor, to an audio interface, and the resulting signal may be used by a method for producing audio from electric signals within a data processing device.

Accordingly, a method may be provided for receiving a stream of audio data, and identifying an audio event in the audio data by generating an n-dimensional representation, wherein the n-dimensional representation includes a dimension representing timbre of the audio event, and comparing the representation to expected representations of audio events along a plurality of the n dimensions.

In some embodiments, the method may first identify a plurality of audio events, generate n-dimensional representations for each audio event, and identifying a pattern by evaluating the plurality of audio events. In some embodiments, the pattern recognition may be based on a subset of the n-dimensional representations that are determined to be related on the basis of the timbre dimension. The pattern may be, for example, a tempo, or a particular pattern previously defined.

Once the audio event or pattern is identified, the method may output a sound selected based on the classification of the audio event, or may otherwise respond on the basis of the audio event or pattern identified.

The n dimensions used to represent the audio event may each represent different aural qualities of the audio event, such as tonal or timbre components. Once the n-dimensional representation is generated, it may be compared geometrically with a plurality of audio zones defined by expected signal parameters in at least two of the n dimensions associated with a sample sound.

In some embodiments, a training method is provided for training such a system, the method comprising selecting an audio event or pattern to implement into the model and generating the audio event.

DETAILED DESCRIPTION OF THE PREFERRED EMBODIMENTS

Figure 1:
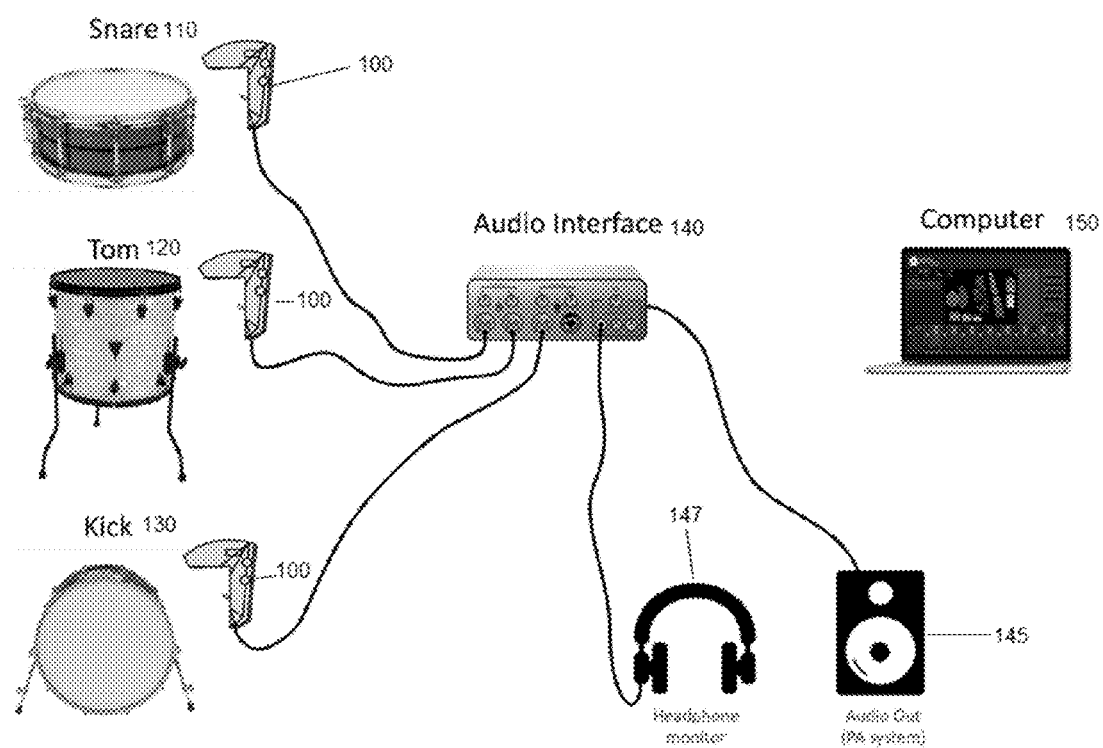
FIG. 1 shows an implementation of a system for capturing and synthesizing audio from musical instruments.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A hardware system is combined with software methods to capture sounds from a musical instrument, interpret those sounds, and use the generated signals to control a computer, such as controlling the audio output of a computer. Such a system may emulate or synthesize the sound captured, or it may instead output audio samples mapped to those produced by the musical instrument. Mapped audio samples may be new sounds not sonically related to the actual sounds of the musical instrument, but rather audio structurally related to the acoustics of the instrument and the musicians way of interacting with it.

The hardware components described include a device comprising multiple sensors that can be used to capture sound from a musical instrument, referred to herein as both a device and a microphone. The captured sound is converted to an electrical signal which may be processed at a computer system using a variety of software methods. Similarly, the software methods disclosed herein may be utilized to interpret signals extracted from hardware components other than those described to identify and emulate or synthesize audio for a musical instrument. It will further be understood that while the embodiment disclosed relates to percussion instruments, specifically drums, similar hardware and software may be employed to capture and emulate sounds from other musical instruments and acoustic objects as well.

The software routines described are designed to extract musically relevant information from the signals such as the onset of events (drum strikes, note onsets), quality of sound (timbral content), rhythmic structures (tempo, time signature, phrases). The software methods described are able to extract these multiple layers of musical information and translate them into a symbolic data format that allows these levels of musical information to be used as generic control sources for other purposes. This system is designed to work both in real time, responding to immediate sensory input, as well as responding to a pre-recorded sensory input.

FIG. 1 shows an implementation of a system for capturing and synthesizing audio from drums. As shown, the system comprises several devices 100 for capturing audio from drums. Identical devices 100 can capture audio from a variety of drum types, including snare 110, tom 120, or kick 130 drums.

The audio captured is transmitted as an analog signal to a pre-amp or audio interface with analog-to-digital conversion 140 which processes the audio signals and then further processes the audio, selects an audio sample to output, and then generates an output signal to transmit to an audio output, such as a PA system 145 or a headphone monitor 147. In some embodiments, the audio interface transmits a resulting digital signal to an external computer 150 for further processing and for selecting an audio sample or applying an audio synthesis process and generating an output signal. In such embodiments, the computer 150 may be connected to an audio amplifier or speakers for outputting audio signals in real time, or it may be configured to store the results of the analysis or a recording of an audio output. In some embodiments, the computer 150 or the audio interface 140 may be connected to other hardware devices, such as lighting systems or hardware synthesizers, that may be controlled by the system via an interface to allow for user designed output profiles. For example, control messages may be output as generic MIDI messages that can be routed outside the system.

This system may be used for a real time performance, in which case audio is captured from each drum 110, 120, 130 of a drum kit using the devices 100, transmitted to the audio interface 140 for processing, either processed by an onboard processor or sent to the computer 150 for further analysis and classification, and transmitted to an amplifier for immediate playback of emulated or synthesized sounds. While the immediate playback may be of samples designed to sound as similar as possible to the acoustic playback of the drum kit, it may also be playback of alternative samples or synthesized sounds designed to give the drum kit a different sound profile, such as that of a different drum kit, a different type of drum, or distinct samples unrelated to traditional percussion performance. Further, the signal may be interpreted and used as a control signal for functions other than audio, such as hardware synthesizers, lighting, or other devices.

Figure 2:
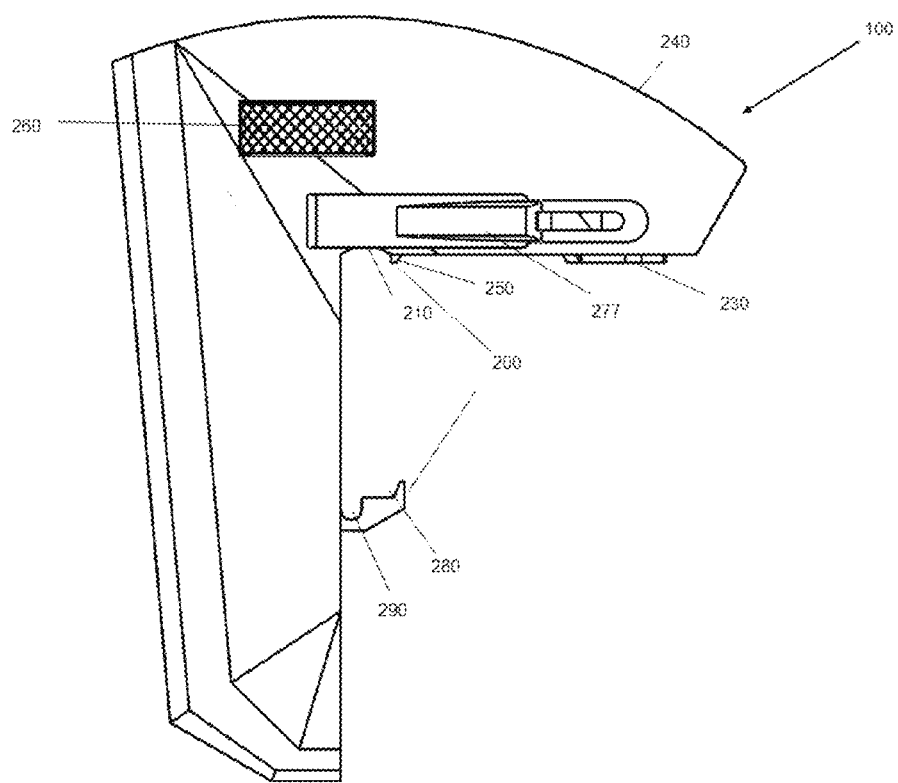
FIGS. 2 and 3 are left and right side views of a device for capturing sounds from a percussion instrument.
Figure 3:
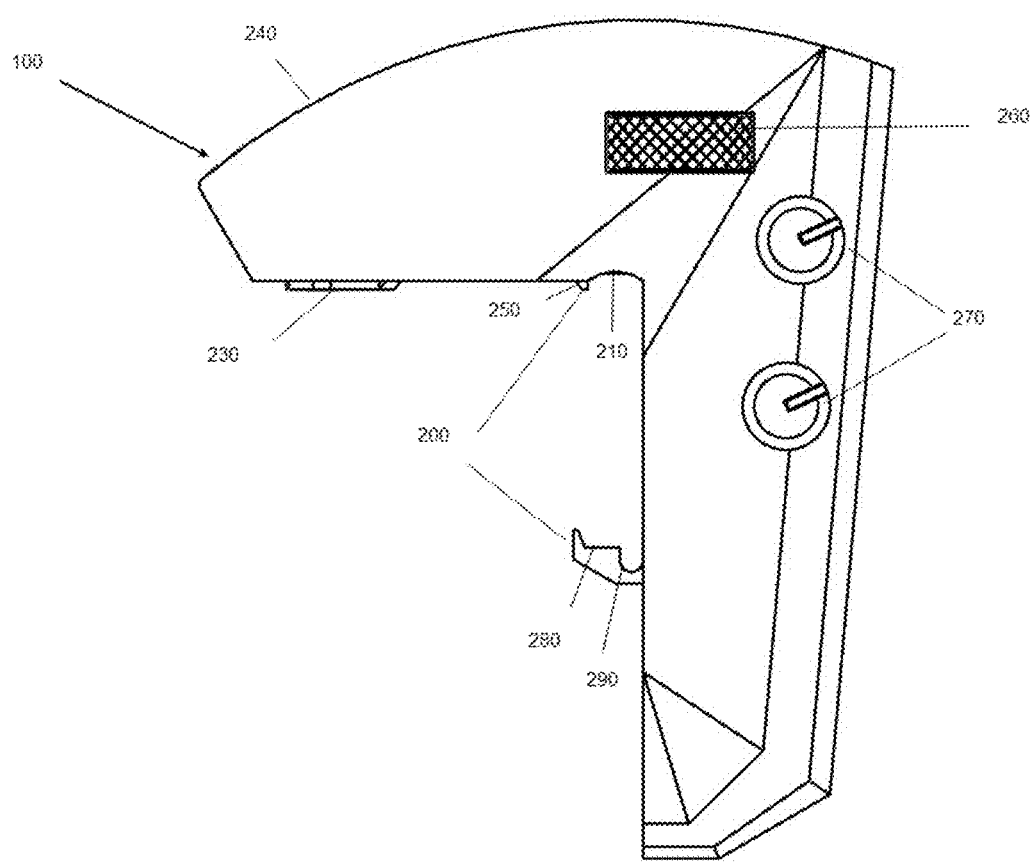
Figure 4:
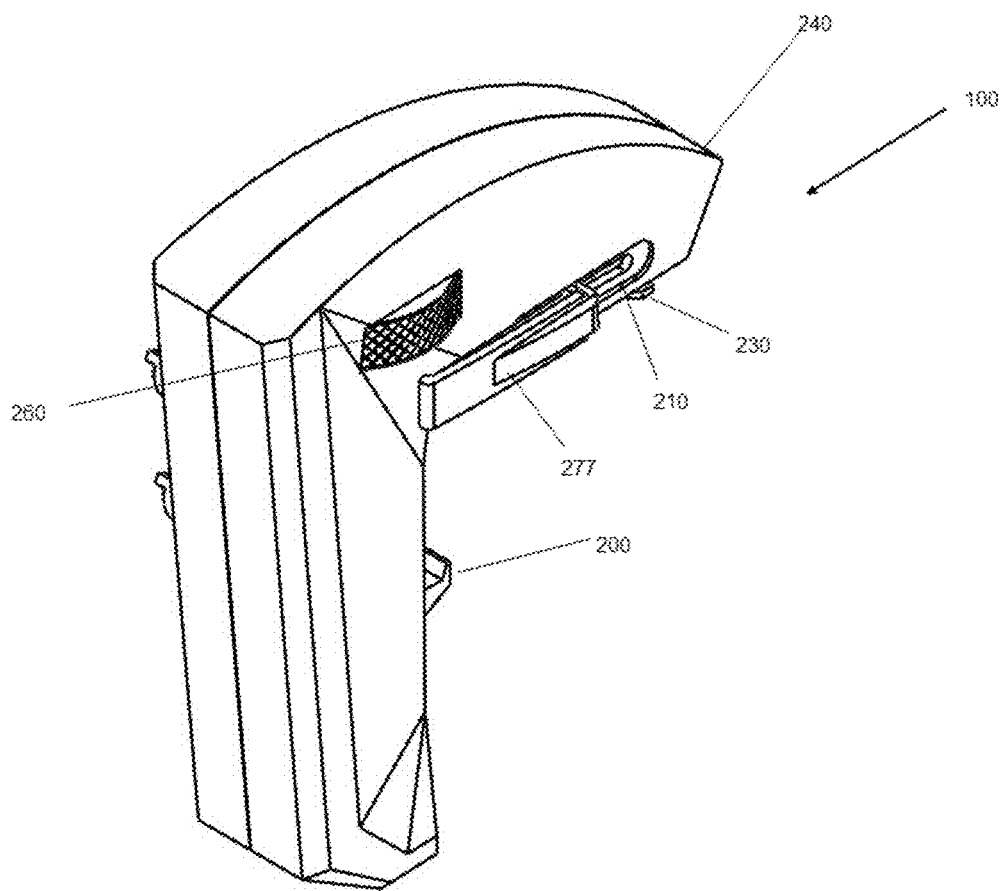
FIG. 4 is a left side perspective view of the device of FIG. 1.
Figure 5:
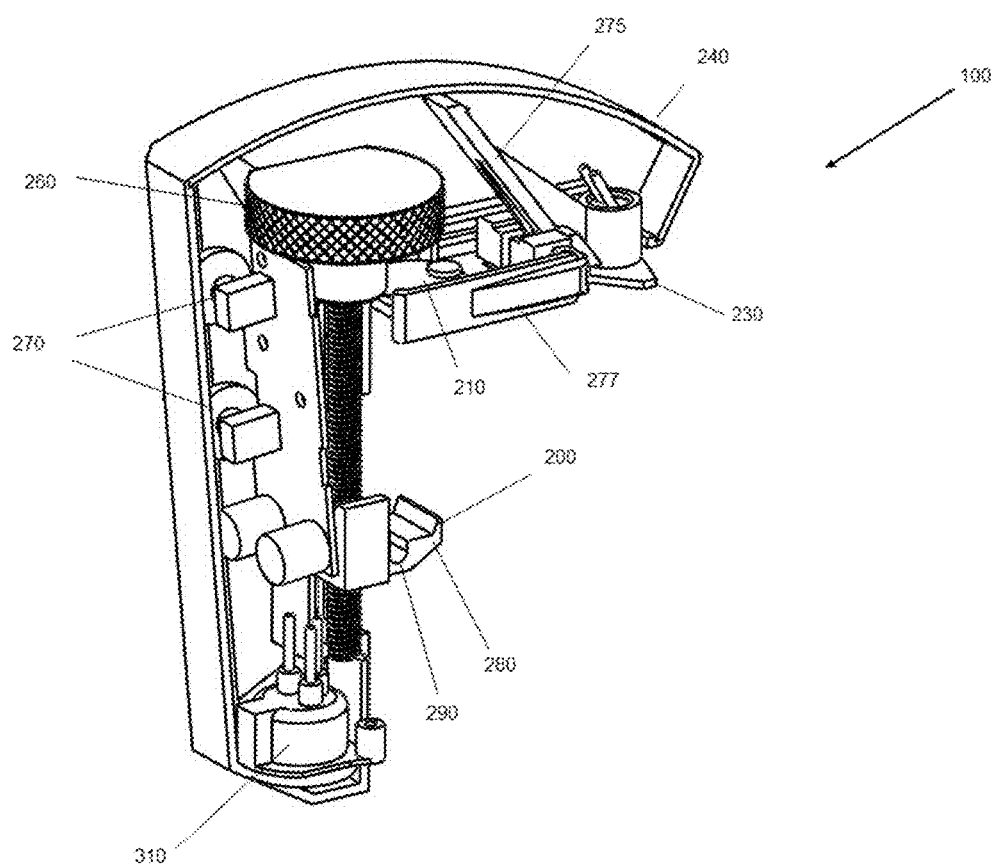
FIG. 5 is a partially sectioned left side perspective view of the device of FIG. 1.
Figure 6:
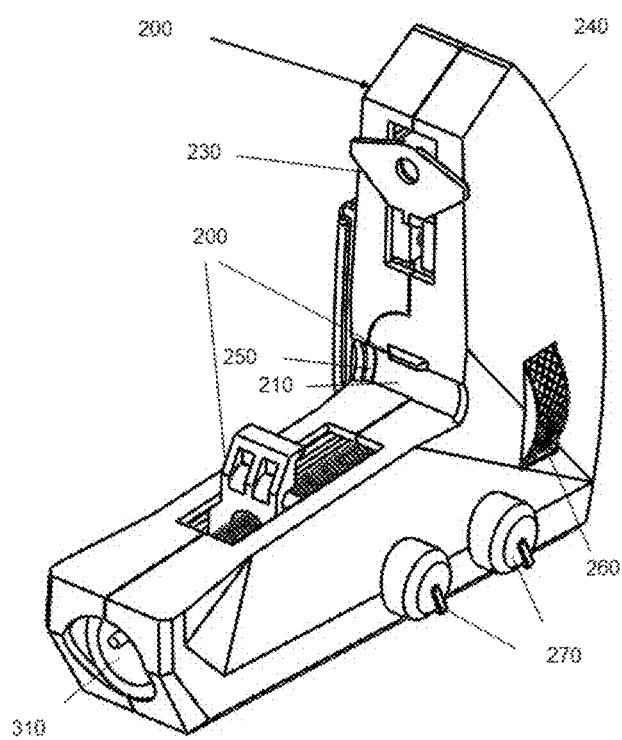
FIG. 6 is a bottom perspective view of the device of FIG. 1.
Figure 7:
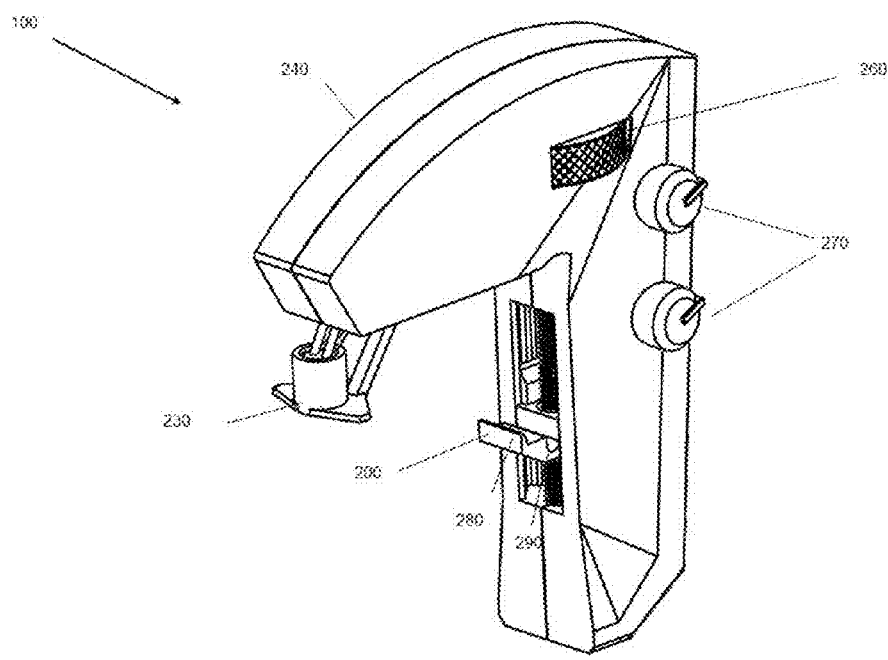
FIG. 7 is a right side perspective view of the device of FIG. 1 with a sensor extended therefrom.
Figure 8:
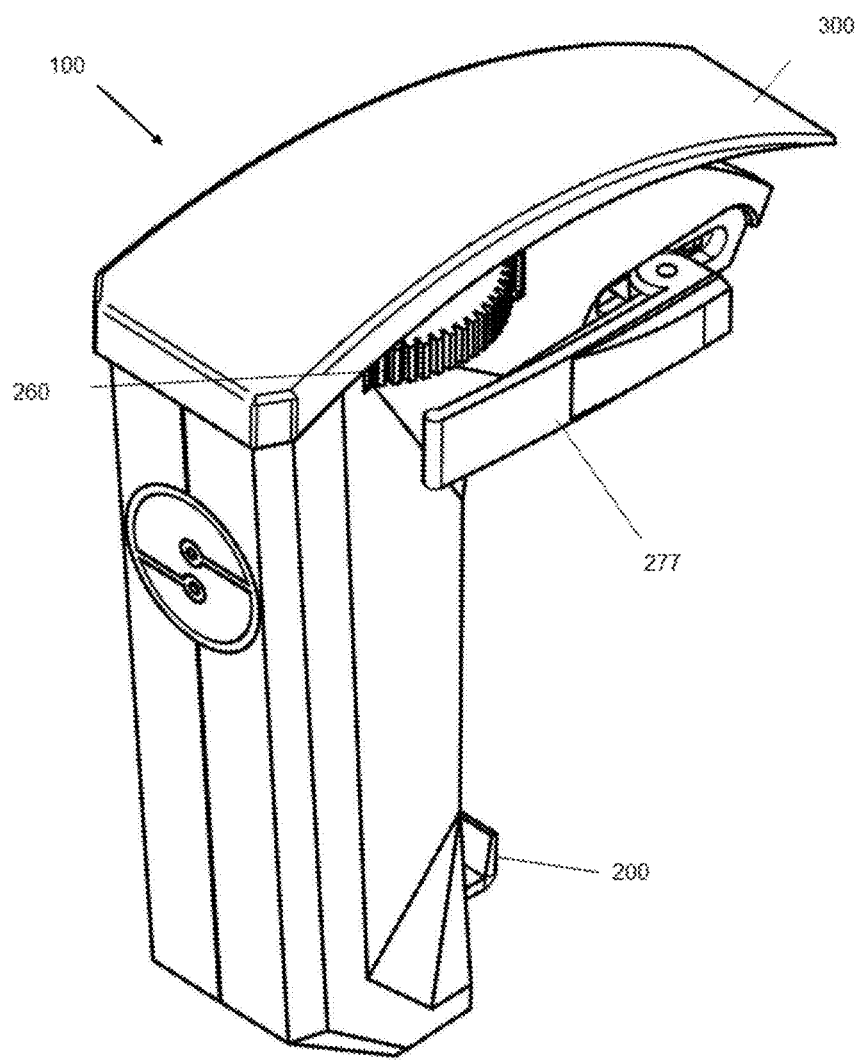
FIG. 8 is a left side perspective view of a second embodiment of a device for capturing and synthesizing audio from musical instruments.
Figure 9:
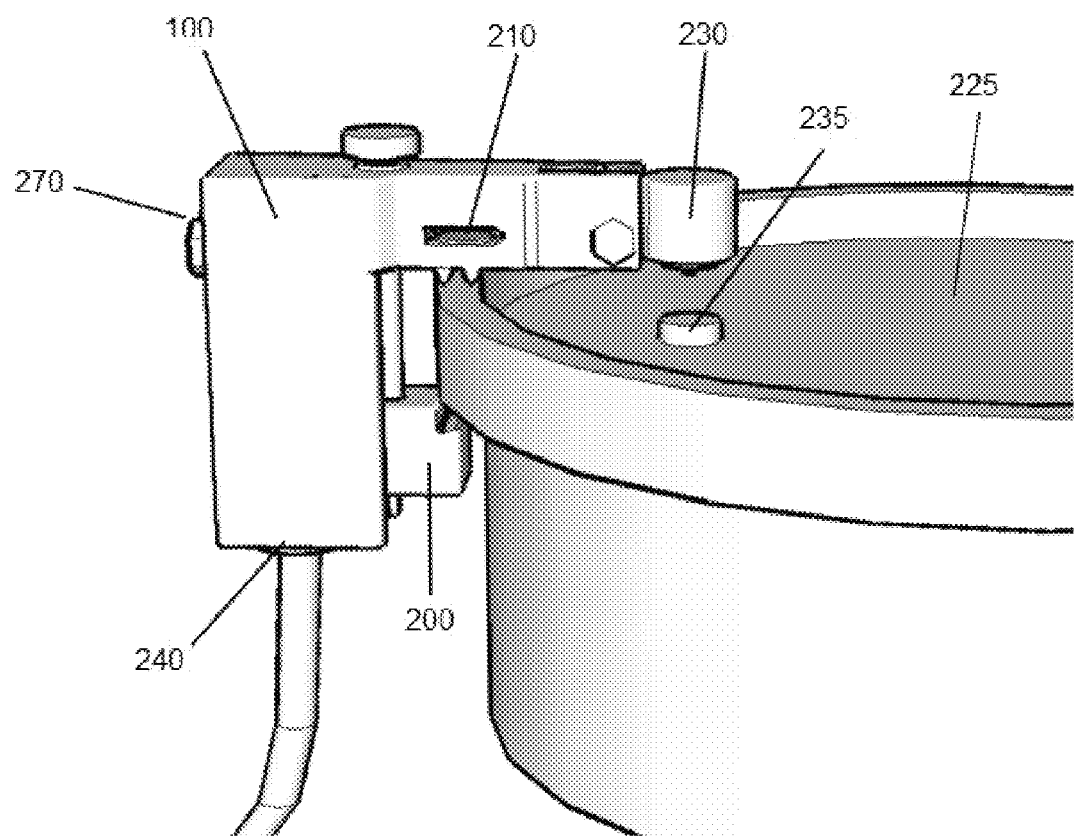
FIG. 9 is a perspective view of the device of FIG. 1 mounted on a drum.

FIGS. 2 and 3 are left and right side views of the device 100 for capturing sounds from a percussion instrument, FIG. 4 is a left side perspective view of the device 100, FIG. 5 is a partially sectioned view, FIG. 6 is a bottom perspective view, and FIG. 7 is a right side perspective view of the device 100 with a sensor extending therefrom. FIG. 8 is a left side perspective view of a second embodiment of the device 100, and FIG. 9 is a view of the device 100 mounted on a drum 110.

The device 100 has a fixation element 200 for fixing the device to the musical instrument, a first sensor 210 to be fixed in contact with a rim 220 of the drum 110 to transduce vibrations from the rim or shell, or other rigid elements, of the drum, and a second sensor 230 suspended by the fixation element at a fixed location relative to the drum. The second sensor 230 transduces vibrations from the drum head 225, or other soft membrane elements. It will be understood that in the case of musical instruments other than drums, the second sensor 230 may be otherwise suspended at a fixed location relative to the musical instrument. All of these components may be installed within a housing 240 designed to arrange the described components with respect to each other and retain the sensors 210, 230, at specific locations with respect to the drum 110.

The fixation element 200 may be a clamping mechanism, and the first sensor 210 may be mounted within a grip 250 of the fixation element 200 so that it is secured to the rim 220 of the drum 110. The first sensor 210 may be of any type that can extract a signal from vibration of the rim 220, such as a piezoelectric element. When the fixation element 200 is secured to the drum rim 220, the first sensor 210 may then detect and capture vibrations on the rim and shell of the drum.

Alternatively, the first sensor may be a piezoelectric filament embedded inside the housing 240 of the device, rather than within the grip 250, and placed over the rim of the drum adjacent the upper clamp, or grip 250, of the fixation element. A small (approximately 20 mm) ceramic piezo disc element or a Polyvinylidene fluoride (PVDF) piezo film of similar size may be used. This transducer, or sensor, 210 may then pick up vibrations from the rim and shell of the drum. While piezoelectric sensors are described, other types of sensors are contemplated as well.

The second sensor 230 is suspended from the housing 240, or from the fixation element 200 or an extension of the fixation element, and is selected to detect vibrations in the drum 110, specifically the drum head 225, and exclude ambient sound. For example, the second sensor 230 may be a coil sensor, such as an electromagnetic coil pickup, for detecting a vibration in the drumhead 225. Such an electromagnetic coil pickup may be made by wrapping copper thread around an iron core, and a suitable coil may be a small telephone pickup coil, such as those typically used to record phone conversations directly from telephone receivers.

Other types of sensors are contemplated for the second sensor 230 as well, such as high speed cameras or laser based sensors. When using a high speed optical camera in place of the coil or laser, the camera is aimed at the membrane of the drumhead, which transmits video of movements of the membrane. An audio signal is deduced by analyzing changes in the video feed, such as, for example, a circular marker on the membrane whose diameter will appear larger or smaller to the camera based on its proximity. The fluctuations in diameter act as a measurement of the membrane's vibrations.

Where the second sensor 230 is an electromagnetic coil sensor, it may be paired with a small magnet 235, such as a rare-earth magnet, fixed to a surface of the drum head. The magnet may be fixed to the surface of the drum using glue or transfer adhesive, and it may be provided in the form of a disposable permanent or one-time use sticker.

As shown in FIG. 7, the second sensor 230 may extend from the housing 240 of the device. The second sensor 230 may be provided with adjustments 275 for moving the sensor parallel to or perpendicular to the drum head for positioning the sensor, or adjustments may be provided to lower the sensor at an angle towards the drum head. Once the second sensor 230 is positioned, a cam lock 277 may be used to secure the location of the sensor. When the second sensor 230 is an electromagnetic coil sensor, the adjustments may be used to position the sensor directly above the magnet 235 fixed to the surface of the drum head and control the distance between the coil and the magnet, which controls the sensitivity of the transducer.

The housing 240 may further contain a thumb screw 260 for adjusting the fixation element 200 to fit a variety of musical instruments 110, 120, 130, as well as potentiometers 270 for adjusting the gain of each of the two sensors 210, 230. While two sensors, and two corresponding potentiometers, are shown and described, additional sensors or sensor types may be provided for increased data and accuracy.

Fixation element 200 may be a clamp, and may include hooks designed to fit a variety of instruments, such as various standard drum heads. As such, an upper portion of the clamp may be the grip 250 containing the first sensor 210, while the lower portion of the clamp may be a hook with a first segment 280 for gripping one type of drum, such as a bass drum, and a second segment 290 for gripping a second type of drum, such as a snare drum.

As shown in the alternative embodiment of FIG. 8, the device may further include a strike bar 300 which would both protect the internal components of the device from stray impacts, and may act as an independent striking surface for drummers to utilize to create unique sounds or effects. In some embodiments, the strike bar may be used to trigger visual effects, such as lighting sequences. The strike bar is mounted above the second sensor 220 such that it rests opposite the second sensor from the drum head. The strike bar 300 is tapered and/or curved such that striking the bar at different points along its length exhibits a timbre or tonal shift so that a wide variety of sounds may be made by striking the bar at different points. The strike bar 300 may be fixed to the housing 240 near the fixation element, or elsewhere on the housing, and cantilevered over the second sensor 230 such that a portion of the strike bar is suspended to allow for a variety of sounds.

Output may be transmitted to the pre-amp through a standard audio output port 310, such as a female XLR output jack.

In some embodiments, the device 100 may incorporate onboard mixing hardware within housing 240 to mix the signals from the first sensor 210 with the signals from the second sensor 230 and the output through the XLR interface 310 may then be provided as a mono audio channel.

Figure 10:
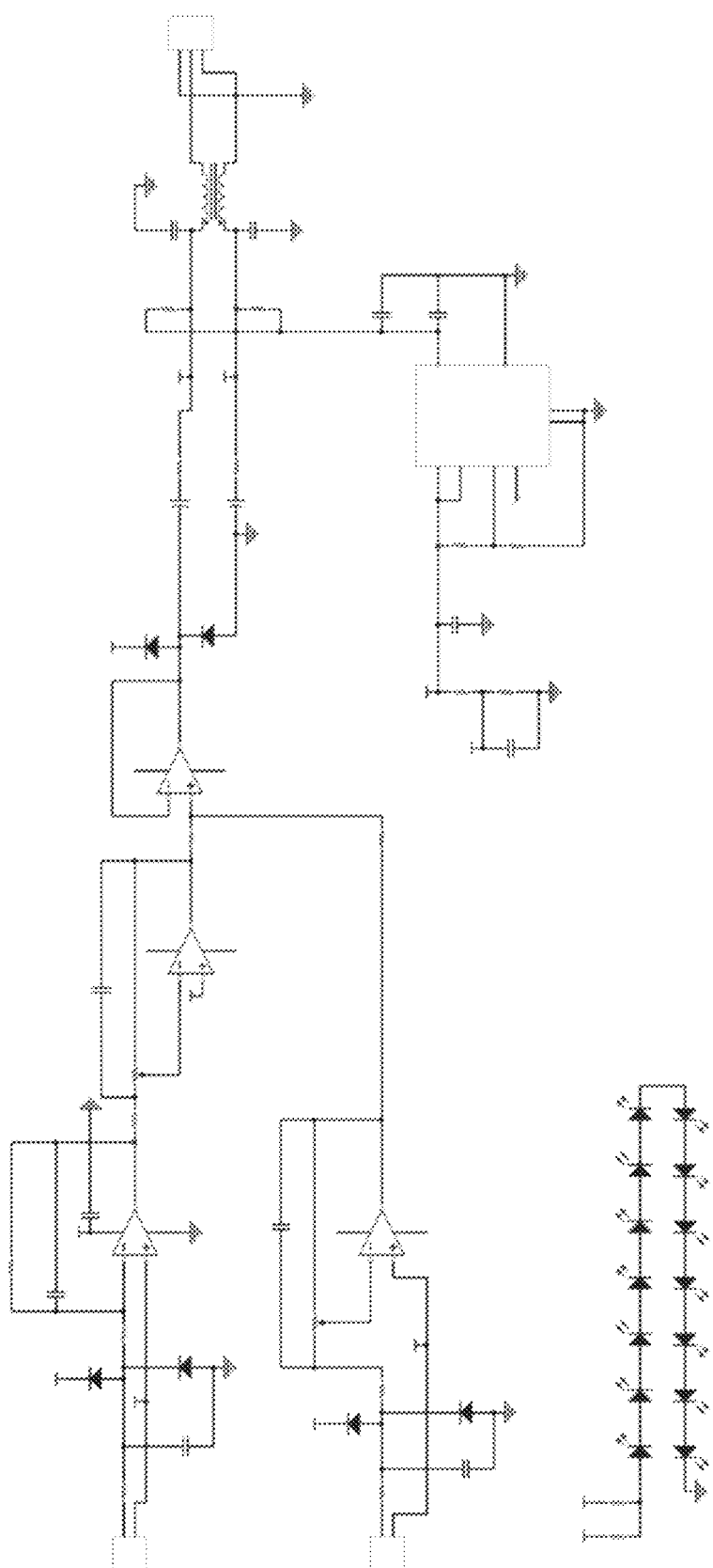
FIG. 10 is a circuit diagram illustrating onboard mixing circuitry for the device of FIG. 1.

FIG. 10 shows one example of onboard circuitry that may be implemented in the device of FIG. 1. The onboard circuitry may be comprised of active preamp and mixing circuits powered via phantom power at 48 volts carried along the output cable, or by an external power source with either a battery or power provided from a wall plug. These circuits actively condition the signals from each transducer and mix the signals for output. This is achieved with operational amplifier circuits, using a charge amplifier configuration for the piezoelectric signal conditioning, an inverting preamplifier configuration for the magnetic coil and two buffer op-amp circuits to mix the signals. Each signal has a variable potentiometer 270 with which the user can control the gain independently before mixing.

After mixing, the device 100 outputs a mono signal along a balanced line via the XLR port 310, which in turn connects to the pre-amplification unit and analog-to-digital converter 140 to supply the software system with a digital audio stream.

In some embodiments, the first sensor 210 and the second sensor 230 are provided without fixation element 200. In such cases, the first sensor 210 may be placed directly on the surface of the drum 110 and the second sensor may be suspended above the drum head 225. In some embodiments, a system may be provided for analyzing multiple drums 110, 120, 130 of a drum kit, and each drum may be provided with a first sensor 210, while a second sensor may be provided to capture vibrations from all drums of the drum kit.

Figure 11:
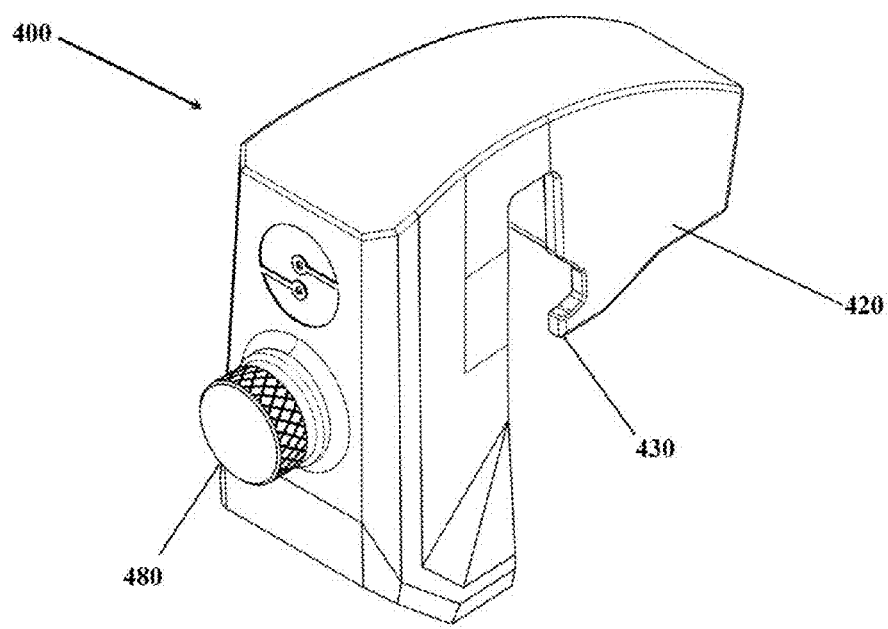
FIG. 11 is a left side perspective view of a third embodiment of a device for capturing and synthesizing audio from musical instruments.
Figure 12:
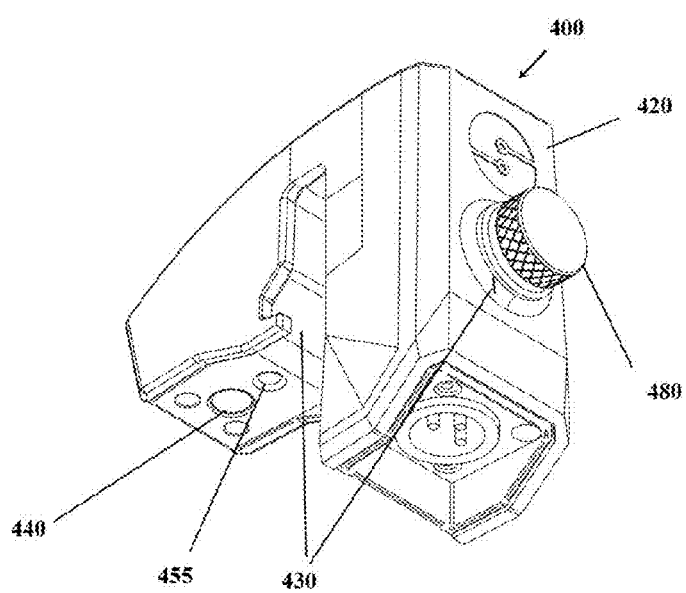
FIG. 12 is a right side bottom perspective view of the device of FIG. 11.
Figure 13:
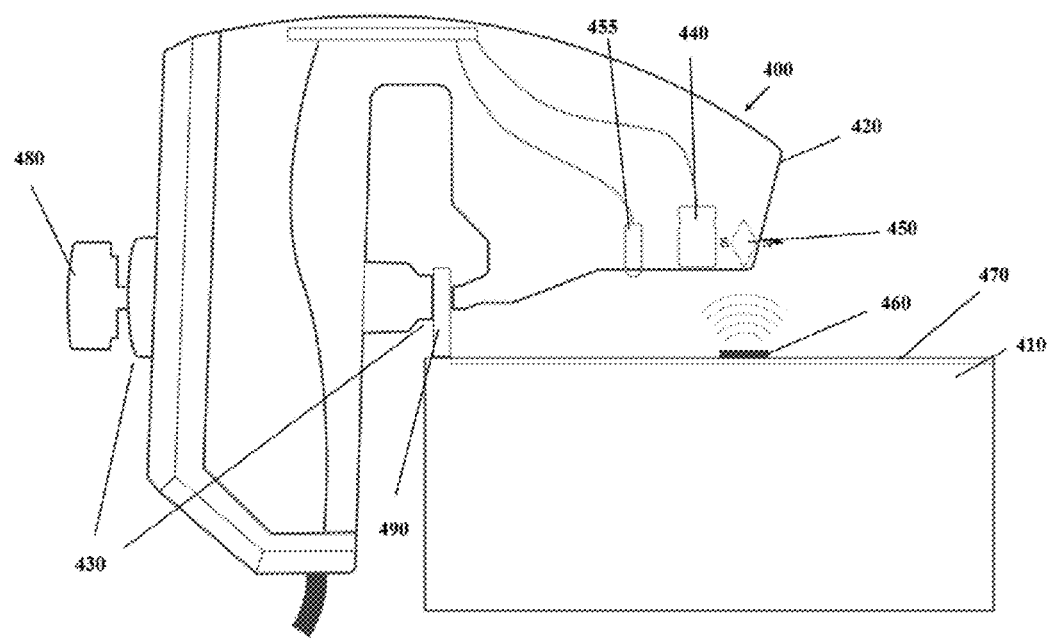
FIG. 13 is a left side view of the device of FIG. 11 mounted on a drum with several components schematically shown.
Figure 14:
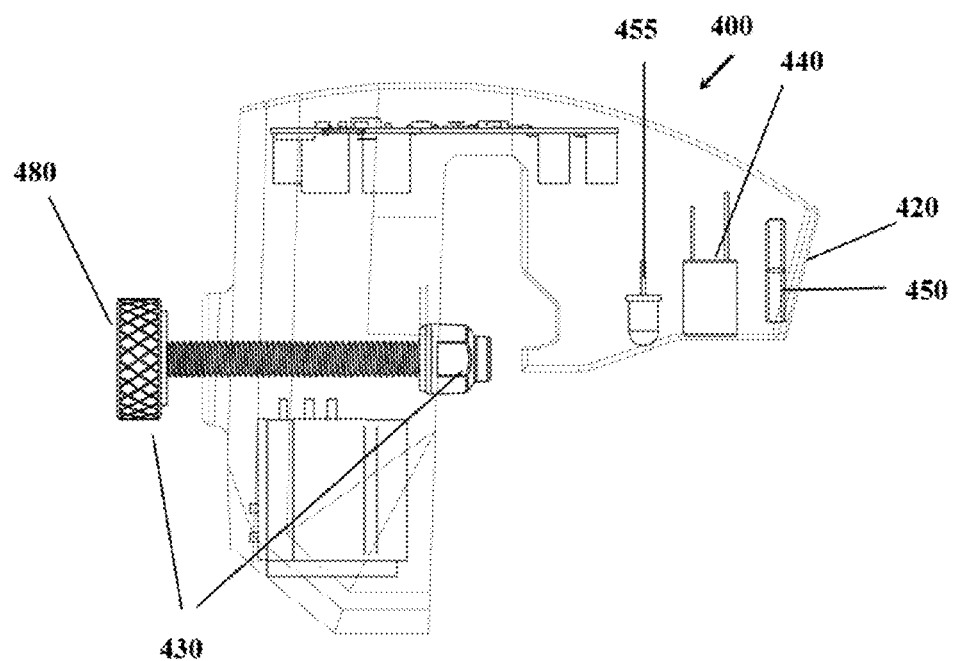
FIG. 14 is a left side view of the device of FIG. 11 with the housing shown transparently.

FIG. 11 shows a left side perspective view and FIG. 12 shows a right side bottom perspective view of a third embodiment of a device 400 for capturing sounds from a musical instrument. FIG. 13 is a left side view of the device 400 mounted on a drum 410 and with several components schematically shown and FIG. 14 is a left side view of the device 400 with the housing 420 shown transparently.

The device 400 has a housing 420 for containing the various components of the device. The housing 420 including a fixation element or assembly 430 for fixing the device 400 to the musical instrument. While a drum 410 is shown in the example, variations on the device 400 may be implemented in different instruments. When the housing is fixed to the drum 410 by the fixation element, a first sensor 440 within the housing 420 is located relative to a surface of the drum 410. A magnet 450, such as a neodymium nickel plated magnet, is provided adjacent the sensor 440 within the housing, and in a typical implementation, a steel shim 460 is fixed to the drum 410 on a drum head membrane 470 and is located directly below the sensor 440 during use of the device. While a steel shim 460 is described, any ferromagnetic attraction element, i.e., any object that is conducive to magnetic attraction, may be used. In some embodiments, a light 455 is provided for illuminating the drum head. In such embodiments, the light may be used for aligning the sensor 440 above the steel shim 460 so that movement of the shim is properly detected. This is particularly useful during performances where lighting may be minimal.

During use, when the drum head membrane 470 vibrates, such as in response to a hit from a drumstick, the steel shim 460 vibrates, thereby disturbing the magnetic field of the magnet, and inducing vibration or a detectable disturbance in the magnetic field in the magnet 450. The vibration in the magnet 450 may, in turn, be induced by the sensor 440, resulting in an electrical signal. The signal may then represent the induced vibration of the magnet or, in some embodiments, a recording of the relative distance of the drum head membrane 470 and the sensor 440, thereby isolating ambient sounds.

The fixation element 430 may be, for example, a clamping mechanism as shown, and may include a screw type closure element 480 for securing the device to a rim 490 of the drum 410. The fixation element 430 is constructed so as to clamp only to the rim 490 so as to extract vibrations from the rim and isolate those vibrations from any other ambient vibrations. Further, the geometry of the fixation element 430 is selected so as to transmit vibrations induced from the rim of the drum to the magnet 450, which is in turn induced by the sensor 440, within the housing 420. Accordingly, during use, when the drum rim 490 vibrates, such as in response to a hit from a drumstick, the vibration of the rim is transmitted through the fixation element to the sensor 440.

In some embodiments, the fixation element is a clamp 430 received on two opposite sides of the drum rim 490 and is oriented along a direction parallel to the drum head membrane 470. Accordingly, vibrations from the drum rim 490 transmitted through the fixation element 430 are received at the sensor 440 in a direction substantially parallel to the drum head membrane 470 and vibrations induced from the magnet 450 may be received in a direction substantially perpendicular to the drum head membrane 470.

The sensor 440 is typically a transducer, such as a microphonic pickup comprising a coil inductor. In alternative embodiments, the sensor may be radar, optical, magnetic, or any other type of sensor that can translate physical movements, lights, or sounds into an electronic signal that may be converted to a digital signal for analysis. As described, the sensor 440 will simultaneously receive signals in the form of vibration from the rim 490 and the head 470 of the drum 410.

In the embodiment described, the output of the sensor 440 may be a mono signal, and the embodiment shown typically would not require any onboard mixing circuitry. In some embodiments, pre-amplification circuitry may be included so that users can control the gain of the signal output by the sensor. In other embodiments, all such control may be implemented in software after the signal is received at a computer.

Figure 15A:
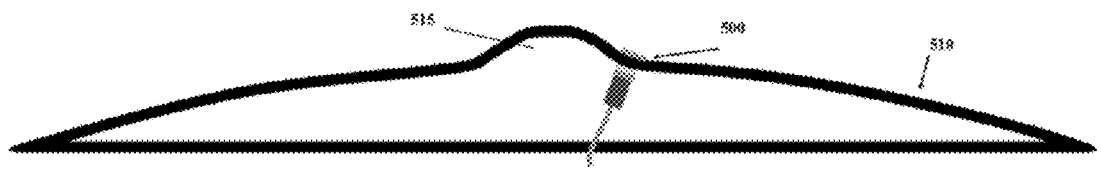
FIGS. 15A-C is fourth embodiment of a device for capturing and synthesizing audio from musical instruments.
Figure 15B:
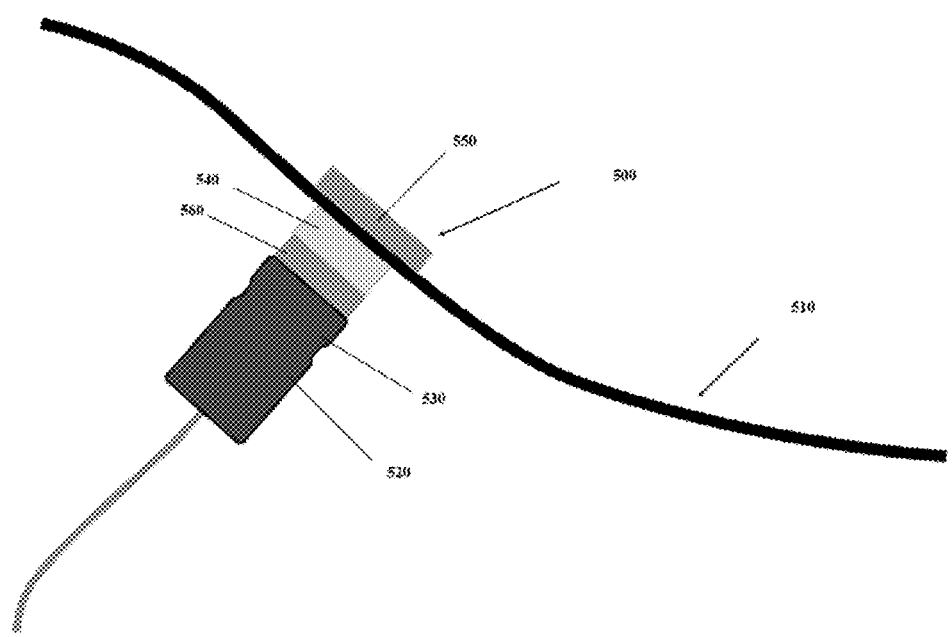
Figure 15C:
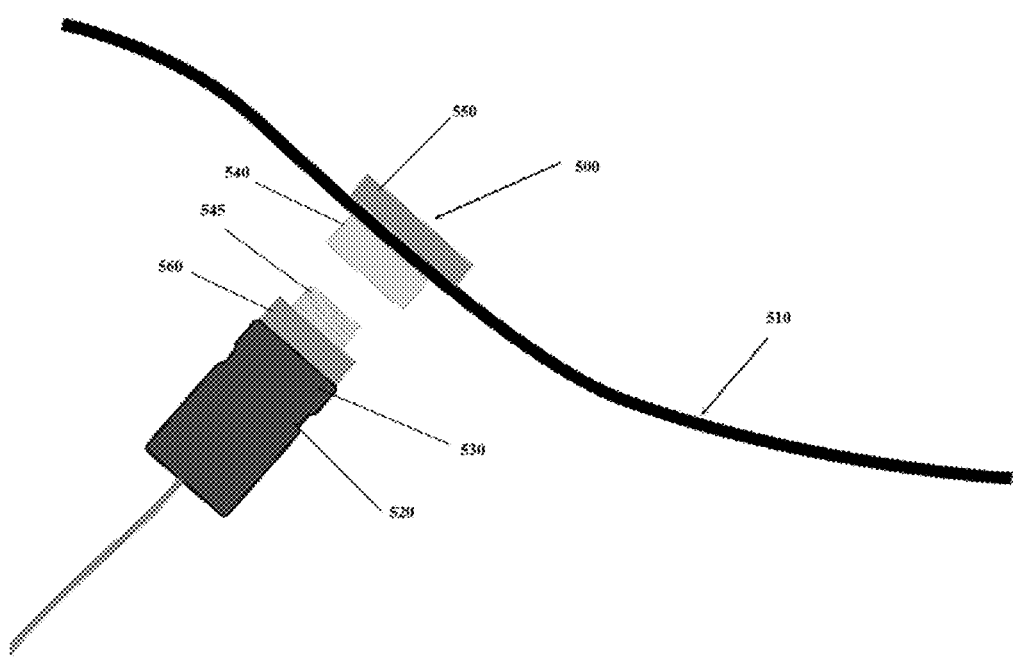

FIGS. 15A-C show a fourth embodiment of a device 500 for capturing and synthesizing audio from musical instruments, with FIGS. 15A and B showing the device 500 in an open and closed configuration respectively. As shown in FIGS. 15A and B, the device 500 may be fixed to a cymbal 510 and comprises a ferromagnetic assembly that can attach to cymbals without causing damage. FIG. 15C shows a detailed view of the device 500, which comprises a housing 520 containing an inductive coil 530 and a threaded nut 540 and bolt 545 set for controlling the distance between the housing 520 and the cymbal 510. As shown, a first magnet 550 is placed on one side of the surfaces of the cymbal 510, typically at the bell 515 of the cymbal and a second magnet 560 is placed on the second side opposite the first magnet, thereby clamping the device in place. Both the magnets and the threaded nut are then secured to the cymbal, such as with tape, to reinforce the clamping of the magnets. It will be understood that other methods of bonding the device 500 to the cymbal 510 are contemplated.

The inductive coil 530 or other type of transducer, then picks up vibration from all parts of the cymbal, including the bell, edge, and bow of the cymbal. It behaves as an electromagnetic pickup that senses all vibrations from striking while ignoring ambient sounds. The transducer is unique in detecting strike patterns and cymbal vibrations to generate superior pickup signals. This is due to the strong neodymium magnets that are in polarity with each other.

The software methods described below may utilize the output of the device 100 discussed above with respect to FIGS. 2-15, but may, in the alternative, be applied to any physical object whose vibrations can be captured by a sensor or set of sensors. Acoustic musical instruments are ideal examples of these types of objects, and the methods are described with respect to analyzing drums.

Initially, the acoustic output is captured and translated into the digital domain through an analog-to-digital converter, such as audio interface 140, and is received by a computer 150 or a processor within the audio interface 140. Many aspects of the following description, including and not limited to the method of performing onset detection, data reduction, model design and selection, classification, design of graphical user interface and method of extracting control values from user generated events may have numerous modifications that can be made without departing from the spirit of the invention. Accordingly, specific values and thresholds are described, but are provided merely as examples, and may be replaced by other values as appropriate.

Figure 16:
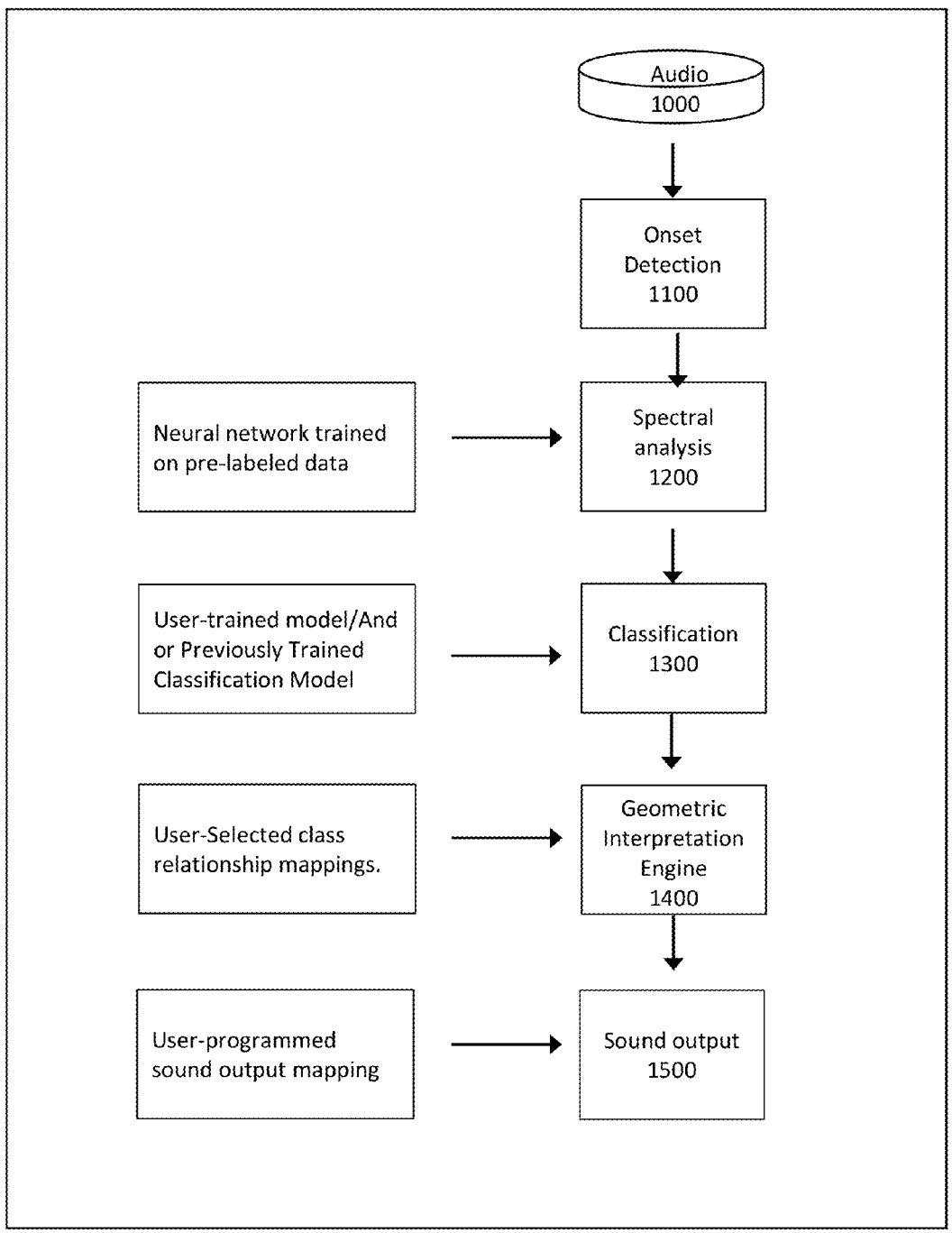
FIG. 16 shows a flowchart for implementing the method of producing sound from electronic signals.

FIG. 16 shows a flowchart implementing a method of producing sound from electronic signals. A computer system 150 configured to operate the method first receives a stream of data, the stream of data comprising the audio data from the pre-amplifier 140 (1000). The method then identifies, in the audio data, the onset of an audio event (1100). The onset may be, for example, an impact of a drumstick with a drum head, and the resulting audio event may be the resulting reverberation of the drum head. The determination of the onset is described in more detail below with respect to FIG. 17.

Once an onset is identified in the audio data, a discrete analysis window is extracted from the audio data based on the location of the onset of the audio event. The analysis window is selected to capture enough time after the onset of the audio event to sufficiently identify the audio event.

After the discrete analysis window is extracted, the spectrum of the extracted segment of the signal is analyzed (1200) and is used to generate an n-dimensional representation of the audio event captured. These dimensions may be selected to capture aural components of the audio event specific to the instrument being captured, and such dimensions may be selected using a neural network trained on pre-labeled data. For example, in the case of drums, or other percussion instruments, these dimensions may be selected to capture the timbre of the audio event. This is discussed in more detail below with respect to FIG. 18. While various methods discussed herein are described in terms of neural networks, it will be understood that they may also be implemented in the context of other machine learning routines.

While the method is described in terms of selecting and analyzing a discrete analysis window, some embodiments of the method may not include this analysis as a discrete step, or at all. Typically, audio data is received, an audio event is identified and transformed into an n-dimensional representation of the audio event, and the audio event is then classified on that basis. In some embodiments, the audio data may be fed directly into a network of transformations that are designed through machine learning training procedures that may include neural networks, deep convolution neural networks, recurrent neural networks or other machine learning methods. The data is then analyzed internally and transformed into n-dimensional representations of audio events contained within the data. This is discussed in more detail below with respect to FIG. 20.

The audio event is then classified (1300) by comparing the n-dimensional representation of the audio event to expected representations of audio events along at least some of those n-dimensions. This may be performed by using a user-trained model to compare previously identified audio events performed with the same equipment to newly captured audio events. This may also be performed by using a fully trained model learned from previously collected data. Such a model may not be trained by the user or on the particular equipment being captured, but may have a generalized knowledge of drum-related events and can perform classification based on that knowledge. In some embodiments, a fully trained model may be provided with the software as a model designed to map to a particular drum kit. Accordingly, such a model may be pre-trained for a large number of commonly used standard drum kits.

Figure 21:
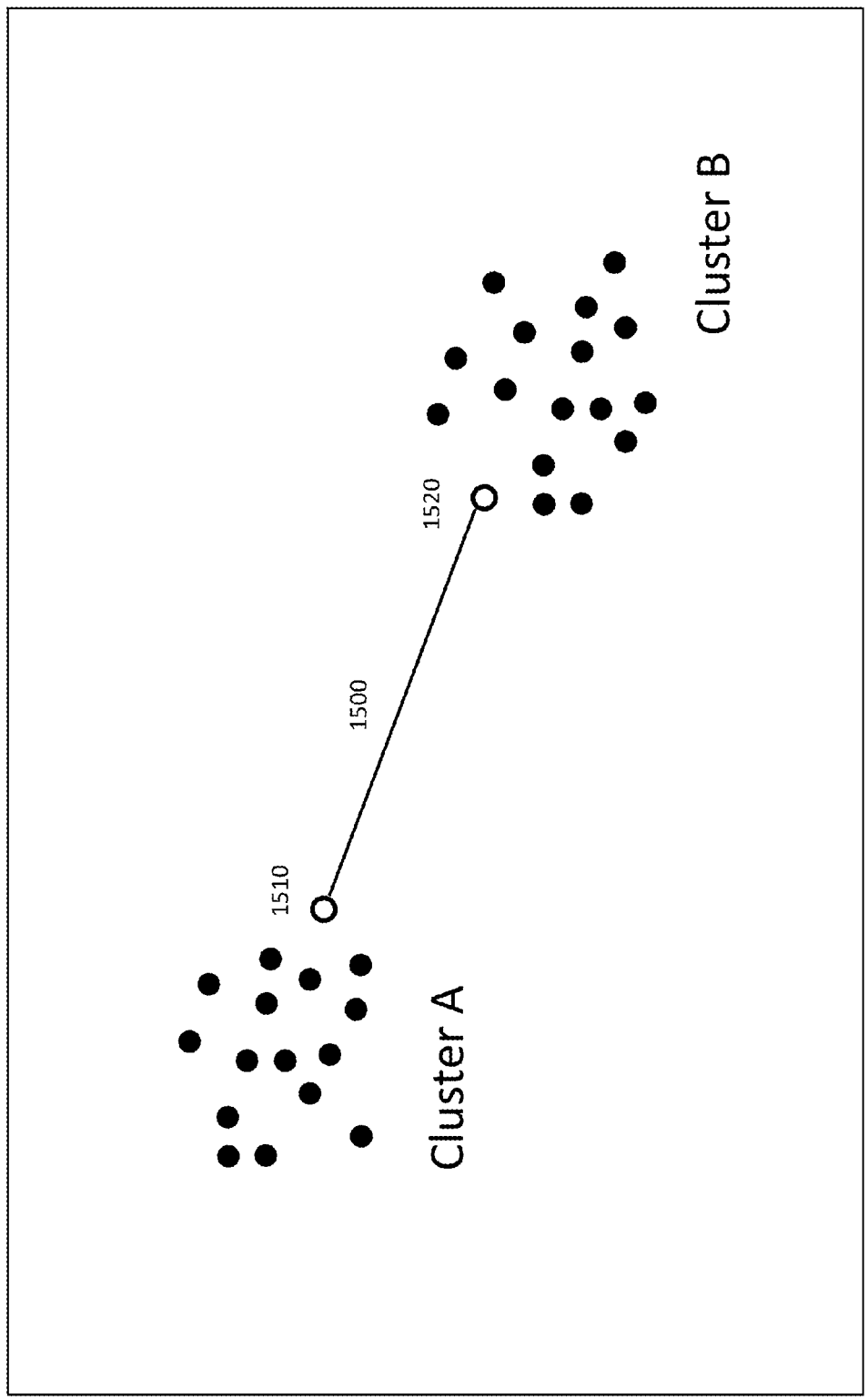
FIGS. 21-23 illustrate the classification of audio signals within a system utilizing the schematic of FIG. 16.
Figure 22:
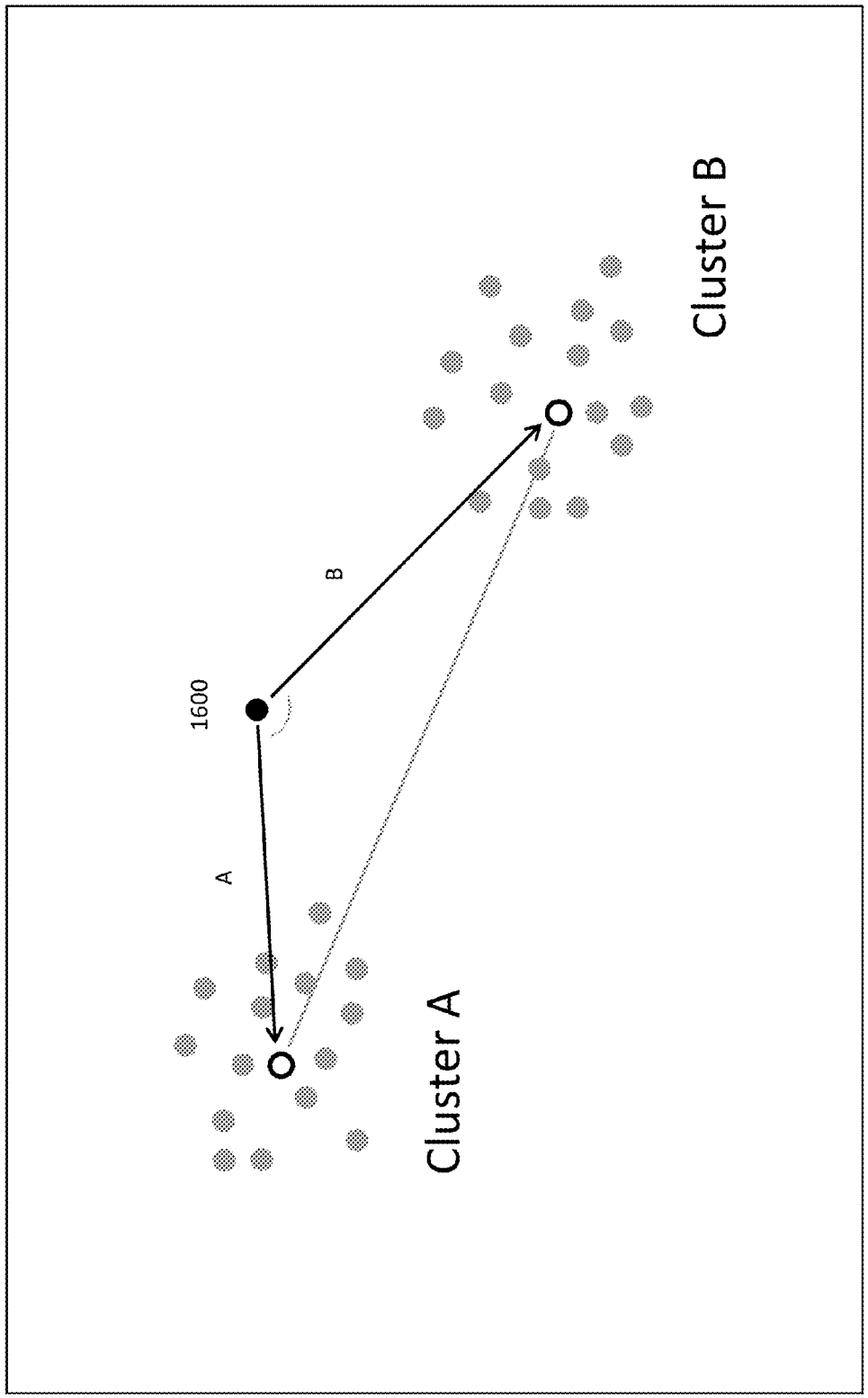
Figure 23:
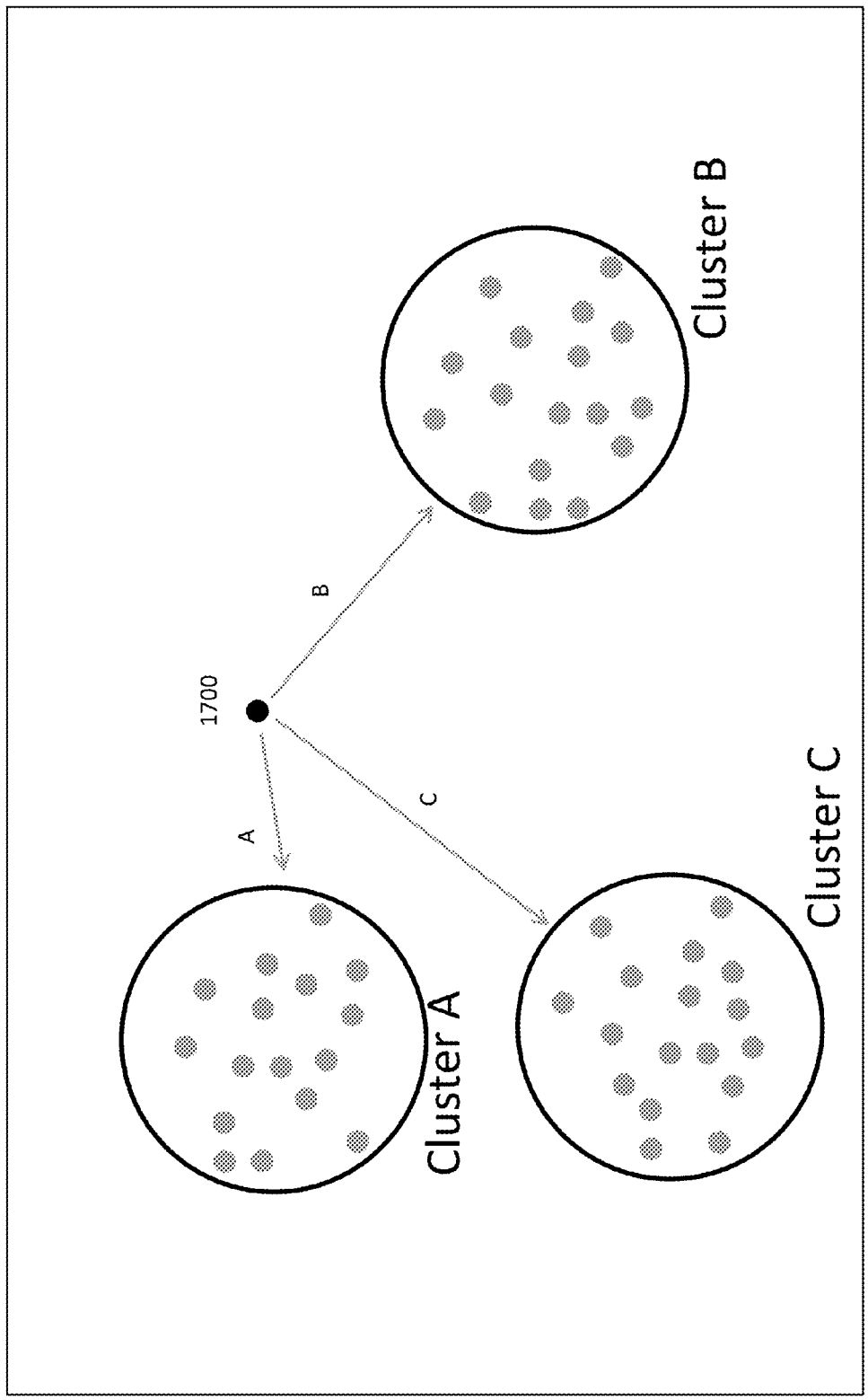

In some embodiments, the classification is then passed through a geometric interpretation engine (1400) to resolve audio events with respect to expected representations of audio events, such as those stored in a database or generated by a user trained model. This process is discussed in more detail below with respect to FIG. 19, and implementations of the process are illustrated in FIG. 21-23.

Finally, audio samples or audio synthesizing processes are selected to be played back based on the classification (at 1300) and geometric interpretation (at 1400), as well as user-programmed sound output mappings and are output as sound (1500). This sound may be saved as a new audio file or may be immediately output to an amplifier or speaker, as in the case of a live performance. The audio sample may be one stored in a database, or it may be created based on multiple stored samples combined based on the geometric interpretation (at 1400). In some embodiments, the audio sample selected for playback is generated entirely based on an algorithm drawing from the classification or geometric interpretation. While the process is described in terms of audio output, the output may be a control signal output for activating a non-audible event, such as a lighting sequence.

Figure 17:
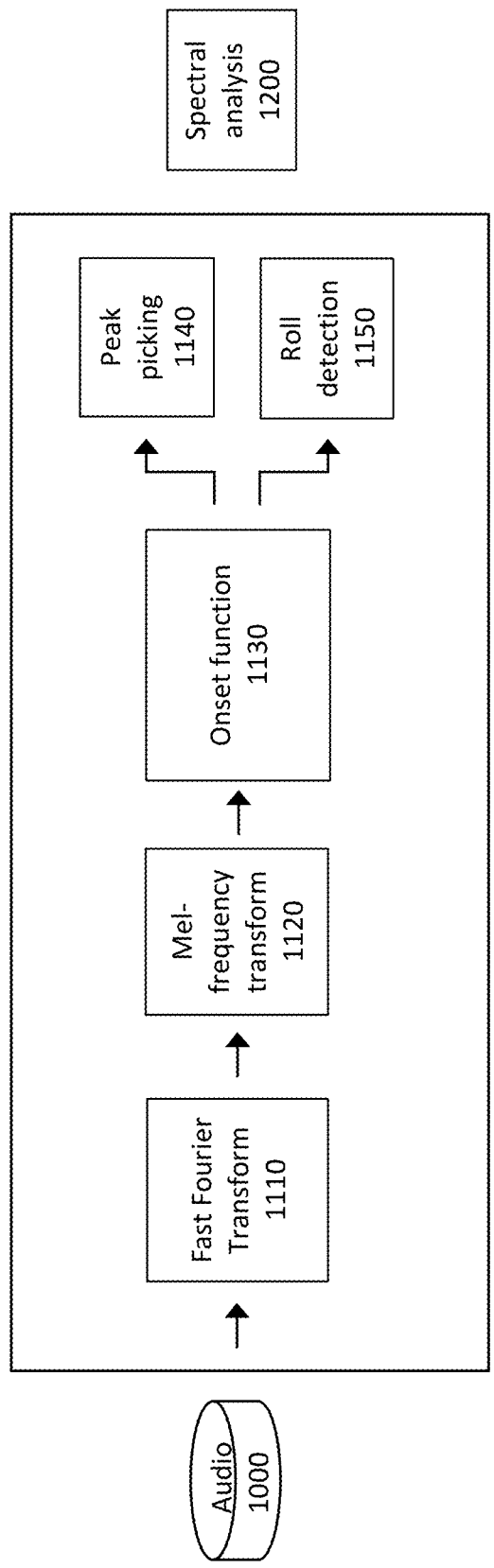
FIG. 17 is a flowchart for a method of onset detection within the schematic of FIG. 16.

FIG. 17 is a flowchart for a method of onset detection 1100 within the schematic of FIG. 16. Initially, the computer system 150 receives the audio data from the pre-amplifier 140 (at 1000) and applies an initial spectral analysis to determine the nature of the onset of the event. This is to determine if the event occurring is a single impact, such as the striking of drum head 225 with a drum stick, or if it is a continuous event, such as a quick sequence of impacts (roll) or a more subtle audio event, such as an impact or sequence of impacts with a brush.

As audio comes into the system as a digital stream, it may be windowed by taking a set of samples and applying a Hann window function, or any other windowing function, to reduce spectral bleed during spectral analysis. The stream may be saved in a buffer to allow for overlapping analysis windows. In the embodiment shown, the computer system 150 initially applies a Fast Fourier Transform (FFT) to the window being analyzed (1110) in order to transform the block of audio being evaluated into a frequency spectrum representation.

Then, a multiband pooling transform may be applied to compress the frequency representation. For example, a Mel-Frequency Transform, or a Constant Q Transform can be applied here (1120). An onset function is then applied to weight and sum various spectral components (1130) to either select a peak to represent the onset (1140) or determine if a roll, or other continuous event, is occurring (1150).

The Onset function (1130) may include first whitening the signal, i.e., reducing resonance in the signal, by dividing by the signal's average spectral envelope. This acts to reduce false onsets when used with very resonant drums. Each band of the pooled representation may then be weighted to favor high frequencies, and the onset function may then convert the window to decibels, subtract from a previous window to create a differential between windows, applying half-wave rectifying algorithms, and then summing the windows. In the described onset function, onsets would be represented by high peaks in the function. While a single onset function 1130 is described in detail, other functions may be used to identify onsets of events as well.

The onset function (1130) is then fed into a peak picking algorithm that searches for peaks in the function while minimizing noise by using a mean adaptive threshold window and controlling for minimum onset distance (which may be, for example, between 2 and 3 milliseconds) and minimum threshold for onset within the context of the onset function. In one embodiment, the algorithm tests for the following three criteria, with sample time values provided for reference, to determine if an onset has occurred:

a. Is the current frame value larger than all previous frames within a given window of time (about 3 milliseconds)?

b. Is the current frame value greater than a given threshold value plus the average of previous values within a given window of time (about 3-16 milliseconds)?

c. Has a previous onset occurred within a given window of time (~3 milliseconds)?

While the algorithm described has been tuned for use with drums, it may be adapted to work with other instruments by using corresponding onset functions.

The output of the onset function (1130) and/or the original audio frame is then also sent to an algorithm to detect sustained events, which are indicated by sustained or frequent peaks in the onset function. This algorithm may be used to detect specific musical gestures and techniques, such as rolls on a drum where a smooth sound is produced by pressing the sticks against the drum to create rapid bounces of the sticks on the head, or the presence of a continuous gesture such as that created by rubbing brushes (bundles of fine metal wire) on the head of the drum as is common in jazz music.

Some embodiments, in the case of a continuous gesture, may bypass the onset detection step (at 1100) and proceed to the timbre or spectral analysis stage (at 1200). This allows for analysis and processing of continuous sounds and timbral changes that are not preceded by detectable onsets.

In such a scenario, a neural network, such as that described below, may be trained to subsume the task of onset detection as well as classification and spatial projection of continuous events. Alternatively, the onset detection module may be utilized to recognize a pattern of continuous sound and trigger the analysis stage to perform continuous analysis until the onset detection module detects that the continuous event has ceased.

Once an onset has been detected within the length of the analysis window, a sample-accurate onset detection algorithm is applied in order to localize the beginning of the onset. A length of audio that contains the detected onset is bandpass-filtered to remove low frequency and high frequency components, emphasizing frequencies around 10 kHz. The frame is then halfwave rectified and processed to create a running maximum vector. This is calculated by examining each sample within the window in the direction of time, searching for new maximum values and saving the current maximum value to a vector. The start of the onset is determined by finding the index of the first value in this vector of running maximums that exceeds some threshold value. The vector of running maximums may be normalized so that its values lie in the range of 0 to 1 which allows for the use of a standard threshold value regardless of the original amplitude of the onset. This sample start value is then used to extract an audio frame that contains the beginning of the event or onset and extends into the onset for a given number of samples, referred to as an analysis frame or analysis window.

The method may require a fixed length of audio information for any given event in order to generate an analysis frame. The fixed length may be user selected, and the length of the frame results in an inverse relationship between latency between event and execution and accuracy of the system.

Figure 18:
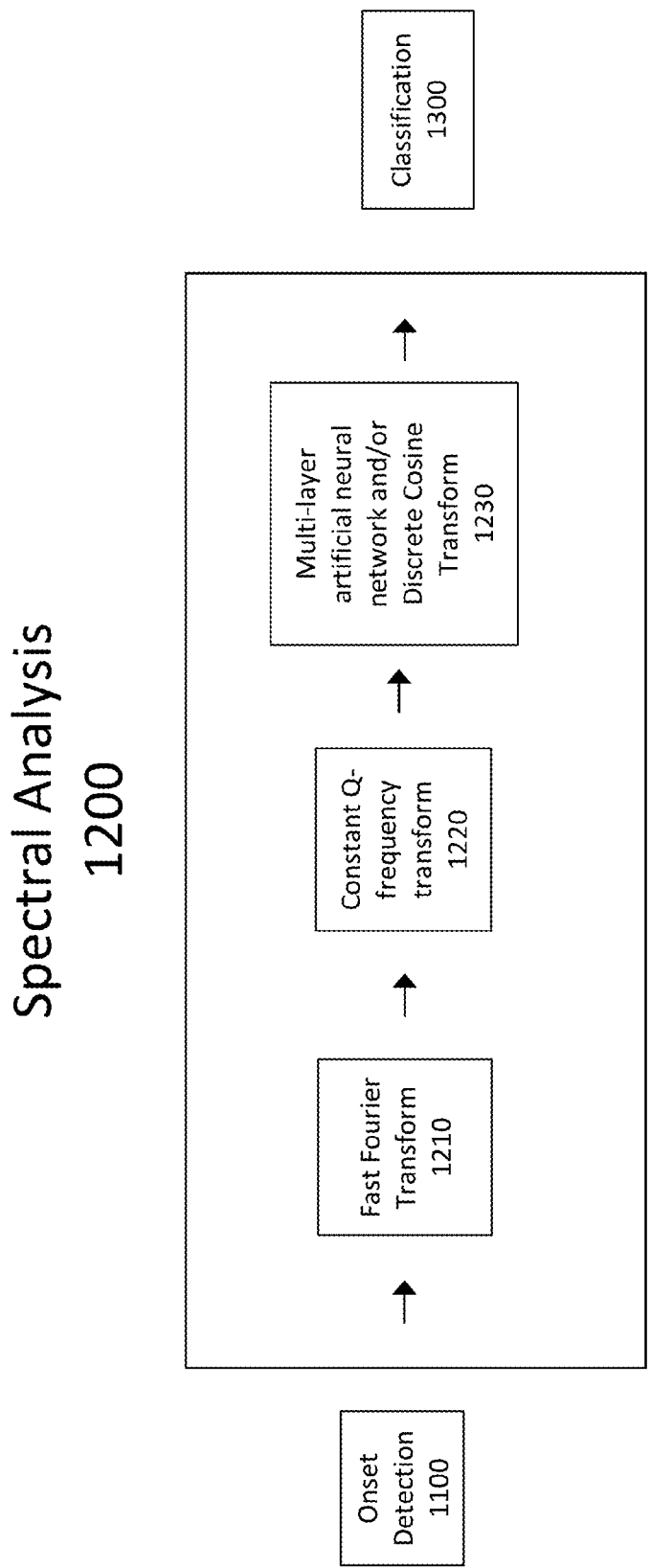
FIG. 18 is a flowchart for a method of spectral analysis within the schematic of FIG. 16.

FIG. 18 is a flowchart for a method of spectral analysis 1200 within the schematic of FIG. 16. This spectral analysis 1200 may be a timbre analysis in the context of a percussion instrument, such as a drum. After an onset is detected (at 1100), and an analysis window is extracted, a Fast Fourier Transform (FFT) is applied (1210) to samples within the analysis window, followed by a Constant Q-frequency transform (1220) to the data series generated by the FFT. While the flowchart illustrates the application of an FFT followed by a Constant Q frequency transform, a variety of sequences may be applied in the analysis. For example:
  a. The windowed data may be left as is, remaining in the time-amplitude representation.
  b. It may be projected into a log-spaced frequency representation through the use of a Constant-Q transform.
  c. It may be processed as in (b), and then projected to the "quefrency" domain by applying a Discrete Cosine Transform. This acts as a data compression step that preserves the frequency structures present in the signal.
  d. It may be processed as in (b) or (c), however using an alternate frequency representation such as a mel-spaced (as with Mel-Frequency Cepstrum Coefficient transforms) frequency representation or a linearly spaced frequency representation (as with a Discrete Fourier Transform).
  e. It may be processed as in (b), (c), or (d) and then dynamically compressed by taking the nth root of all its values or by applying a decibel calculation.

Some of these combinations of transforms may be used to generate, for example, amplitude/phase against frequency for various log-spaced frequency bins.

Further, the transformations described above may be followed by feeding the results into a series of matrix transformations and nonlinearities as is common to neural network systems (1230). A neural network (shallow or deep), that may consist of a series of functions as matrix multiplications with weight and bias values (and subsequent nonlinear transformations, trained on previously collected data through either supervised/semi-supervised/or fully unsupervised methods as is common in machine learning tactics, may be applied to the output of the methods described above. This network of transformations may also be a convolution neural network, where trained weight kernels are multiplied convolutionally across the input.

Such a network may serve several purposes: it may be a fully trained model that results in discrete classification based on a posterior probability by reading the results of a soft-max operation on the network's output as probabilities for inclusion in a given class. It may also serve to project the input data into a new data space wherein data points are ordered in a way that relates to a perception of aural timbre. In this space, similar sounds will produce outputs that are near each other and dissimilar sounds will produce outputs that are farther from each other. This network may also represent a model that has been pre-trained to recognize the various timbres produced by striking a drum with either of the two methods described above, but that subsequently undergoes a calibration process during a user run calibration of the system, where the structure of the model or data space is transferred or transformed to match up to the timbral structure of a drum that is to be used with the system.

In one embodiment, a neural network may be built and trained to produce an embedding of audio data into a lower dimensional space that preserves the structure and relevance of a drum's sonic qualities. One way to implement such an embodiment is by creating a large dataset of labeled data by labeling recordings of a variety of different drums being struck in various ways. A multilabel approach works here as well, such that a frame of audio that contains the audio produced when hitting the drum in the center of the drum head with a wooden tip stick could be separately labeled "centerhead" and "wood stick tip."

Similarly, another data point, produced by striking the drum on the rim with the tip of the stick would have the labels "rim" and "wooden stick tip." Any given data point can have multiple labels that describe what the data point relates to in terms of striking acoustic drums. With this data, a network can be trained to create a model that predicts the characteristics of unlabeled data that is projected into this space. One approach would be to use a DRUM architecture where a Siamese neural network that has identical structure and mirrored weights is given two arbitrary inputs. If these inputs have similar label sets then a cost function is applied and back propagated through both of the Siamese neural networks to encourage the outputs to be similar. If it is given dissimilar inputs, the same is done however the cost function updates the network to ensure that the outputs of the two networks are dissimilar. In this way, a transformation is obtained that projects data points into a space that is geometrically ordered based on the tags in the dataset.

The output of this analysis or spatial projection step may produce relatively low dimensional data points, and a frame of audio of length 1024 samples (23 ms) may be reduced to an arbitrarily small number of dimensions. This data is then used to classify the audio event (at 1300).

Figure 19:
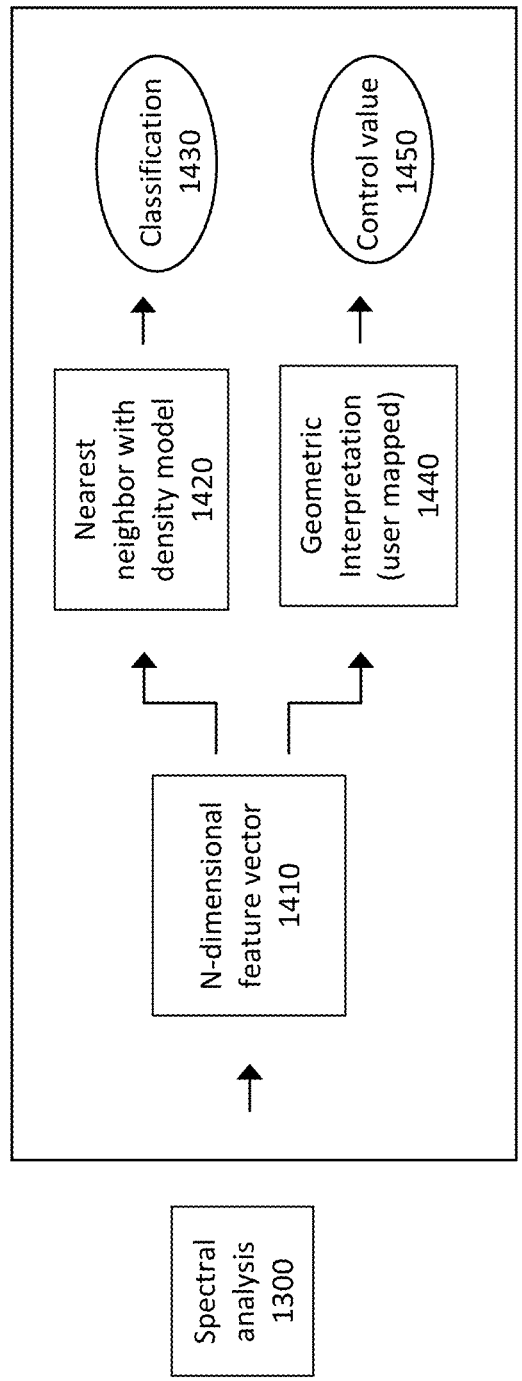
FIG. 19 is a flowchart for classification of audio signals within the schematic of FIG. 16.

FIG. 19 is a flowchart for classification 1400 of audio signals within the schematic of FIG. 16. The results of the spectral analysis 1300 are used to generate an n-dimensional vector or matrix (1410) representing various features of the audio event analyzed. For example, the process described above in (c), utilizing the "quefrency" domain, may produce a data point that has 20 dimensions. The process described with respect to neural networks, on the other hand, may project this audio down to 2 or 3 dimensions, which may be readily visualized for the user. Such a process may also produce a higher dimensional output that represents a lower dimensional embedding of that audio frame in order to preserves relevant sonic qualities of the audio event outside of the easily visualized representation. These data points can then be classified as representing specific types of drum strikes and interpreted to have geometric and spatial significance within a continuous data space.

The vector generated may be used to classify the audio event based on a nearest neighbor model (1420) using density of data points in the model, which could in turn be used to classify the audio event (1430) as a specific type of audio event. Alternatively, the vector may be used to map the audio event based on a user mapped geometric interpretation of the vector (1440), which could then be used to generate a control value (1450) for audio output. These methods may be combined in order to weight the use of the nearest neighbor model with a control value or to use a geometric interpretation in some cases, (i.e., determining the location of an impact on a drumhead), while using a nearest neighbor interpretation in other cases (i.e., determining if a strike is on a drumhead or a rim of a drum).

During playback, each strike of the drum is captured, analyzed, and classified using the classification models described. When using a nearest neighbor model (at 1420), an unlabeled data point is compared to every data point in the model using a distance metric, such as Euclidean distance across several dimensions. Once the closest point in the model is discovered, the new data point is labeled with the same label as that of the closest data point.

In the case of a neural network classification model, the output of the classification model may be in the form of an energy density vector, with each dimension being associated with a different label. As such, multiple labels may be applied with different energy densities, which may be interpreted as confidence values that the data point should be associated with that label. Accordingly, in the example described above, high values in a dimension representing "center of drum" and in a dimension representing "tip of stick" will indicate that the data point represents a strike in the center of the drum using the tip of a drum stick.

As an example of an implementation in a neural network, the audio data may be fed directly into a recurrent convolution neural network that takes the stream of audio as input and performs a variety of calculations at a given rate. Accordingly, rather than identifying discrete events independently and then applying a timbral analysis on the event only, the system may scan the audio and analyze it as a continuous stream. The network may be trained to produce some specific representation automatically if a given audio event is identified as present. Accordingly, once properly trained, the neural network may perform event detection and timbral analysis on its own. Accordingly, while the various steps described above (including windowing, spectral decomposition, and onset detection) are learned as a mathematical transformation through machine learning techniques instead of being trained and programmed discretely.

Figure 20:
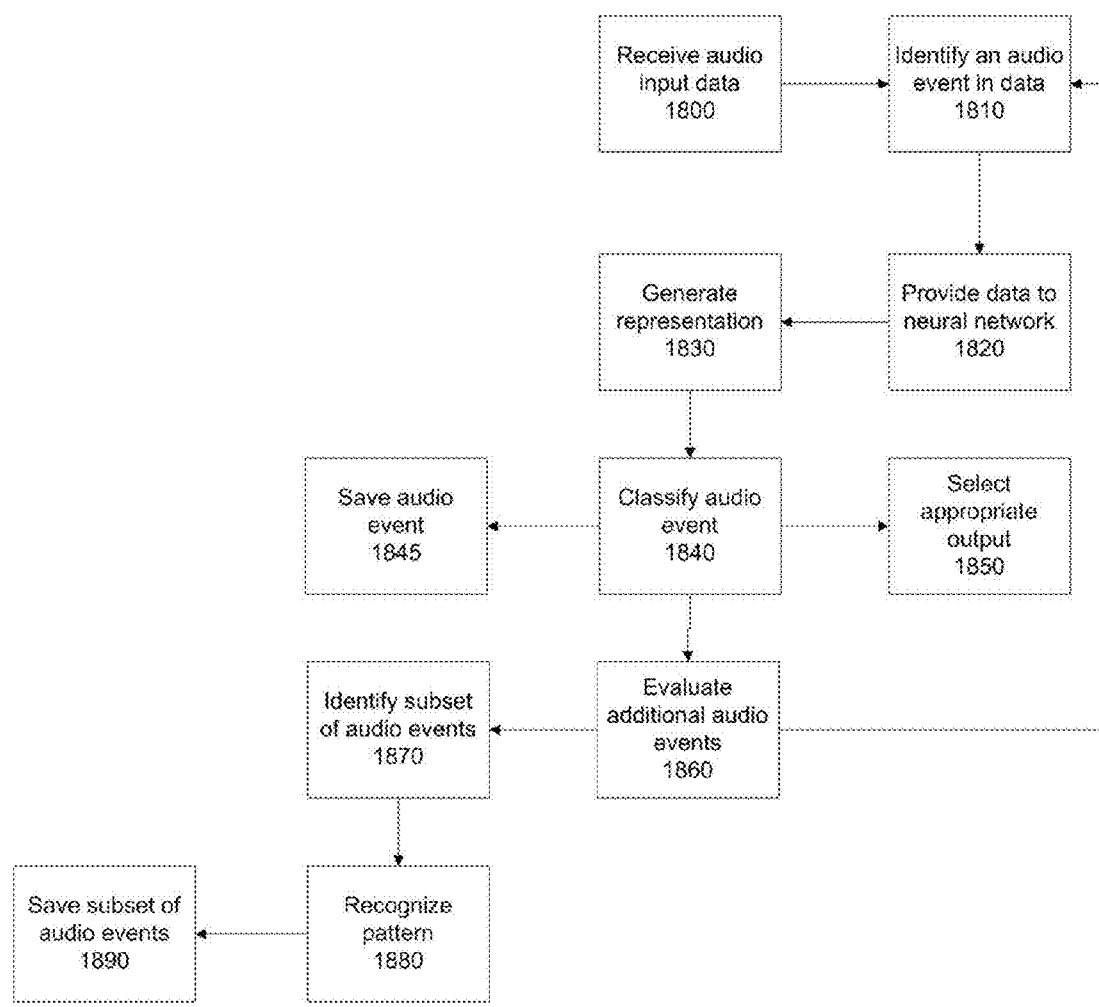
FIG. 20 is a flowchart for an alternative method of identifying or producing sound from electronic signals.

This approach, one embodiment of which is described in relation to FIG. 20, will allow for identification of individual events or patterns of events that unfold over time rather than being limited to discrete events in time. For instance, a strike of a drum can be understood to happen at one point in time, captured in a discrete time window. However, a drum stroke using brushes that creates a sweep across the surface of the drum is not constrained within a given time window, with its shape and definition unfolding over an unpredictable period of time.

FIG. 20 is a flowchart for an alternative method of identifying or producing sound from electronic signals. A computer system 150 configured to operate the method first receives a stream of audio input data (1800) to analyze. The audio data may be, for example, audio data extracted from the devices described above with respect to FIGS. 2-15, or it may be a previously recorded stream of audio data. The method then identifies, in the audio data, an audio event (1810), such as an impact of a drumstick with a drum head.

Upon identifying the audio event (at 1810), the method then generates (1830) an n-dimensional representation of the audio event. This may be, for example, by applying various algorithms to the audio event identified, such as those discussed above, or it may be by providing a portion of the audio input data to a neural network (1820) in order to generate a corresponding n-dimensional representation. In the case of drums, for example, in generating the representation, at least one of the n dimensions corresponds to a timbral characteristic.

The audio event is then classified (1840) by comparing the timbre characteristic to expected n-dimensional representations of audio events. In some embodiments, timbre is one of several dimensions compared in order to more accurately classify the audio event. Other dimensions captured may include velocity of a drum hit, distance in time between notes, envelope of amplitude of incoming audio, pitch, or polyphonic pitch of the hit (in the case of a pitched instrument), among others. The event may be classified, for example, using the methods described below with respect to FIGS. 21-23. In some embodiments, once the audio event is classified (at 1840) the n-dimensional representation associated with that audio event may be saved to a database (1845) as an example of the corresponding audio event. Such data may be used to further train the neural network.

In some embodiments, the classified audio event is then used to select an appropriate output (1850) to be generated at a speaker or an amplifier. In other embodiments, the audio event is simply recorded for later output.

Accordingly, the system described can extract musically relevant information from the sensors provided, parse timbral and audio event information that allows the sonic qualities of the drum to be identified. In some embodiments, this information may then be translated into symbolic controls for other processes. Accordingly, what a drummer would understand as textural sonic expression on the acoustic instrument may then be mapped to a software environment where those expressive sonic textures can be repurposed. Further, the audio events identified may be utilized to control a multitude of individual parameters other than the actual audio corresponding to the drum hits in real time. For example, a single snare drum may be mapped to control a wide variety of audio samples, DSP effects and synthesizers.

In addition to identifying individual audio events in the manner already described, the system may build off of the low-level timbral information extracted to identify new musical elements, ideas, and abstractions by analyzing the sensor input as well as the parsed timbral information over time. In order to do so, the system evaluates multiple audio events and analyzes patterns in such events over time.

Accordingly, in the context of FIG. 20, in some embodiments, the method continues to evaluate additional audio events (1860) within the audio data, and thereby generates n-dimensional representations corresponding to each of a plurality of audio events that occur in sequence. In some embodiments where a plurality of audio events are evaluated, the first audio event may not be classified (at step 1840) instead proceeding directly from the generation of a representation (at step 1830) directly to the evaluation of additional audio events (at 1860).

The method may then identify (1870) a subset of the audio events within the audio data that are related to each other based on their corresponding timbre characteristic as extracted in the n-dimensional representation. The subset of audio events may then be utilized to recognize patterns (1880) within the audio data. For example, the method may identify a tempo of the contents of the audio data. In some embodiments, the pattern, such as the tempo, may be determined based on the entire set of audio events within a portion of the audio data, and the determination may be based on a combination of timber, velocity, and placement of each hit.

After identifying such a tempo, the known tempo may be used to apply various tempo based effects to an output of the system. For example, once a tempo is identified, that tempo may be applied to an audio output stream. In one embodiment, a drummer utilizing a system implementing the method may have a backing track that he is playing along to. The system may then detect the tempo at which he is playing the drums, and apply a delay, echo, or time stretching effects to the audio output associated with the backing track.

In other embodiments, a pattern identified (at 1880) may be a sequence of drum hits, or some other preconfigured sequence. When the system recognizes such a sequence, it may trigger a corresponding output event, such as the playing of a preselected audio sample.

In some embodiments, when a pattern is identified, the n-dimensional representations of the subset of audio events comprising the pattern may be saved to a database (1890) as an example of the pattern identified. Such data may later be used to better train the neural network or other machine learning routine.

As the user performs in this environment, data from the sensor, from the timbre recognition engine, metadata about what is being controlled (i.e. samples name and sonic content, types of effects, etc.) and from information volunteered by the user may be gathered and used to learn larger musical structures, learning new musical abstractions, each building off of previous learnings. These learnings are discussed in more detail below, with respect to FIGS. 24-27.

As shown in FIG. 21, a label for a specified cluster may be applied to a new data point so long as that data point satisfies a density requirement for that cluster. In a given dimension, a ramp 1500 may be drawn between potential data points, and when a data point 1510 satisfies a density requirement for cluster A, it may be assigned a label associated with cluster A. Similarly, when a data point 1520 satisfies a density requirement for cluster B, it may be assigned a label associated with Cluster B.

The classification may then trigger an assigned event, such as the playback of a given sample.

When using a geometric interpretation (at 1440), including when using in conjunction with the classification methods already described, a geometric interpretation of a new data point within the model is derived in order to apply continuous control values and blend settings. Such continuous control values and blend settings may be user selected. This takes the data points within the data model used, and checks for relative distance, using a distance metric, such as Euclidean distance, to extract a relationship between the data point and the other classes, or zones, in the model.

There are several ways of extracting these relationships to convert a point in space relative to other regions of the space as a percentage of a distance between those regions. For example, when used in conjunction with a nearest neighbor classifier model, a given data point may be classified one way, but relate to other classes in the model based on relative distance to those classes in the data space. The model can be considered as a data space, or zone, given a measure of distance. Each of the points belonging to a given class in the model occupy a given region, or zone, of this space. An area of high density in this space can be interpreted as the region of the space that is most representative of that class (i.e. sound of the drum). We can call this the class's center.

As shown in FIG. 22, geometric interpretation involves calculating relative distances of a new data point to its labeled class' center but also to other relevant classes' centers in the model. Geometric interpretation in this case involves finding (A) the distance from the new point to its parent class's center and then finding (B) the distance from the new point 1600 to the center of any of the other classes in the model. This can be normalized and used as a control value for any continuous computer parameter such as the playback volume of an audio sample. In the case of a multi-label classifier, the values in each dimension can be interpreted in a similar way and averaged across certain dimensions to recover a relative distance between classes. As shown in FIG. 23, new classes, or clusters of data points, may be introduced into a model, and in such cases, the relative distance to each zone may be evaluated to properly evaluate a new data point 1700 using a geometric interpretation. Such calculations must therefore be updated to account for new cluster C. This is discussed below in more detail under the heading "Sound Mapping."

Calibration and Training

The calibration or training of the models described above can function in two ways: It can be used to create a data model of a given drum that can be directly used for classification and geometric interpretation, or it can be used as a calibration step where a pre-trained model or neural network can be transformed to better fit the acoustics of the current drum being used in the system as in a transfer learning architectures.

Accordingly, a classification model created in this step can be a nearest neighbors model that uses every labeled data point that the user provides (with statistical outliers removed based on the average density measurement of each class member) to determine the structure of the model. Alternatively, the data generated can be used to create a statistical model, such as a Gaussian mixture model, that can provide a more efficient means of providing a classification of unknown data points. In this step, the user will, one by one, instruct the system on the various sounds that the drum being played can produce.

During training or calibration, the software suggests a list of various regions and drum stroke combos that produce unique sounds specific to drumming that the user should provide. This includes drumstick strikes at the center of the drum head, strikes at the edge of the drum head, strikes at the rim of the drum with the tip and shoulder of the stick, separately, as well as common drum strokes such as cross-stick (where the tip of the stick rests on the head of the drum as the body of the stick is brought down to strike the rim) and rim-shot (where the stick strikes both the head of the drum and the rim simultaneously).

Besides this prescribed list, a user may provide custom strokes, regions, or sounds to be used in the training. The workflow may proceed as follows: a user may switch the software into training mode by pressing the "T" button in the graphical user interface. Once in training mode, the user interface may provide various regions on the screen that represent this list of regions on the drum and the strokes that can be played. These look like buttons or pads with one for each region. When in training mode, these pads can be selected. To train a given region, the user will select the pad that corresponds to that region by clicking on it with a computer mouse and striking the drum in the way that corresponds to the pad (e.g. to calibrate the center of the drum head, a user may select the pad labeled "1 Center" and then strike the drum repeatedly in the center of its head at varying velocities). Each strike of the drum saves a data point to the system that can be associated with that region. Once a satisfactory number of regions have been trained, the user may switch out of training mode by pressing the "T" button once more.

If the system is undergoing training in order to create a nearest-neighbors classification model, the user may train an arbitrary number of the pads. However, it is important that the user provide enough data points per pad to create a satisfactory model. Further, if the system is undergoing a calibration process in order to fine tune a previously trained network, for instance, it will be necessary for the user to provide data for a fixed number of regions. These two methods may be used in conjunction.

During the calibration step, a user may train a "void" pad to recognize ambient noise that erroneously triggers an event in the onset detection module. In a standard drum-set setup, for example, the kick drum will typically vibrate the snare drum, and these vibrations may trigger a false onset. By training the void pad to recognize these types of false trigger events based on their sonic content, they can be appropriately silenced.

Accordingly, in training a "void" pad, a user may first select a first audio event, such as a center hit, to be recognized by and implemented into the model used and perform that audio event at the drum. The user may then select a second audio event, such as a rim-shot to be recognized by and implemented into the model used and perform that audio event at the drum. The user may then select a third audio event, such as a kick drum impact, to be ignored by the model used and perform that audio event at the drum.

In addition to the explicit training of a classification model or the training of the system to adapt to a new drum kit, the system may incorporate passive training methods, such that it is constantly training itself by incorporating data acquired in the context of the processes outlined above, with respect to FIGS. 15-20, into models. In some embodiments, this may be by first classifying various audio events based on the methods described above and then incorporating the n-dimensional models generated for each audio event into the model as labeled data. In other embodiments, this may be by simply feeding the results into a machine learning routine, such as neural networks, deep networks, convolutional networks, recurrent networks, and combinations of those. Different approaches may be used in different contexts to generate a larger data set and allow for richer pattern recognition.

For example, by collecting and analyzing the drummer's drum strokes over time, the timbral content of each stroke, the types of sounds assigned to those strokes and the way those sounds are activated and combined during performance, and then taking that data and combining it with previously collected and labeled data, the model may be trained to more accurately and consistently identify complex musical features such as: tempo, time-signature, specific rhythms, etc.

Accordingly, the passive training methods may be further enhanced by allowing users to manually label some aspects of the data they are implementing, such as indicating an expected tempo. In some embodiments, the system utilizes user-feedback by allowing users to provide metadata that can be leveraged as ground-truth information for learning musical features. For example, a user may employ the use of a Delay DSP effect, which has a parameter that determines the tempo of each delayed repetition. As the user plays within this environment, we may assume their playing corresponds to the tempo set in the delay effect and leverage that information for tempo detection training based on any data collected during that session. Similarly, a looping effect may provide tempo information in addition to downbeat information that would further allow the system to deduce time-signature labels. The labels may then be used to train the various machine learning algorithms in order to increase the accuracy of automatic detection of these musical features. A larger number of users actively using the system drastically increases the amount of data available for training the system, which in turn will allow the system to incorporate more sophisticated pattern recognition features to detect more complex features.

Figure 24:
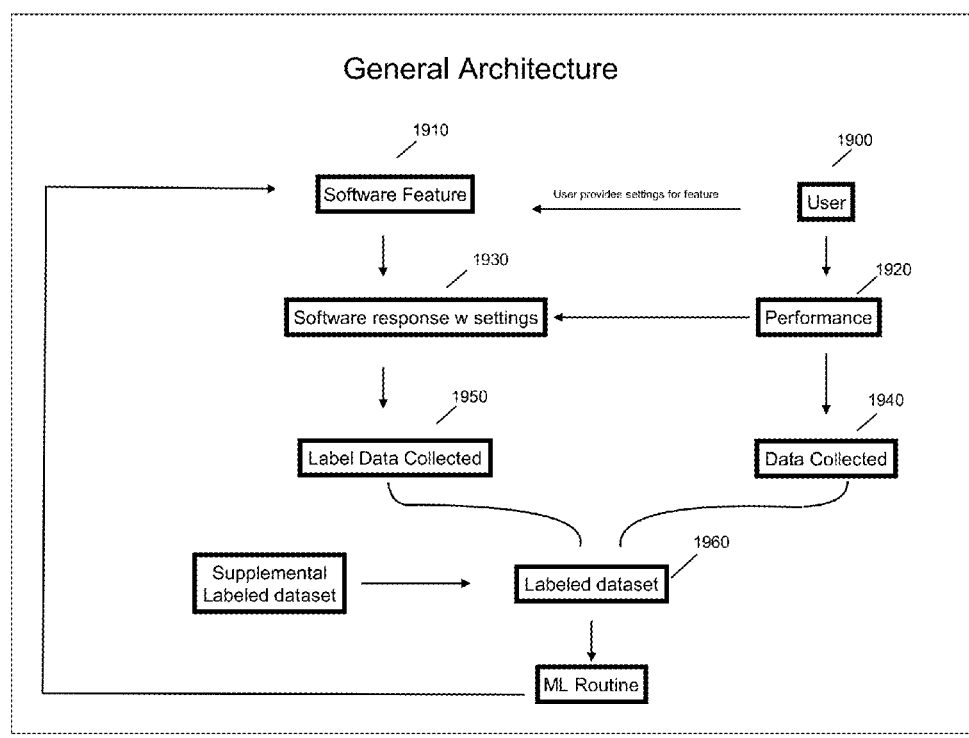
FIGS. 24-27 illustrate the use of user inputs to further train a system according to this disclosure

Accordingly, FIG. 24 provides a schematic diagram illustrating this passive data collection. As shown, a user 1900 provides settings for a software feature 1910, such as an identification of a tempo of an upcoming performance, and then performs on a musical instrument incorporating the system 1920. The software associated with the system then responds, using the feature settings 1930 provided by the user. The system then combines the sensor data collected from the performance 1940 with label data generated based on the software response incorporating the user setting 1950 to create a labeled dataset 1960.

In some embodiments, the labeled dataset may be provided with a supplemental labeled dataset in order to enhance the pattern recognition. For example, when users submit data, the data may be biased to the whims and tendencies of the particular user submitting the data. Generally, such tendencies can be eliminated from the data by utilizing a robust dataset from a wide variety of users. However, where fewer users contribute to a portion of a data model, such as a tempo lower or higher than is typically used, the dataset may be supplemented manually to avoid a bias from a relatively small number of data points.

Figure 25:
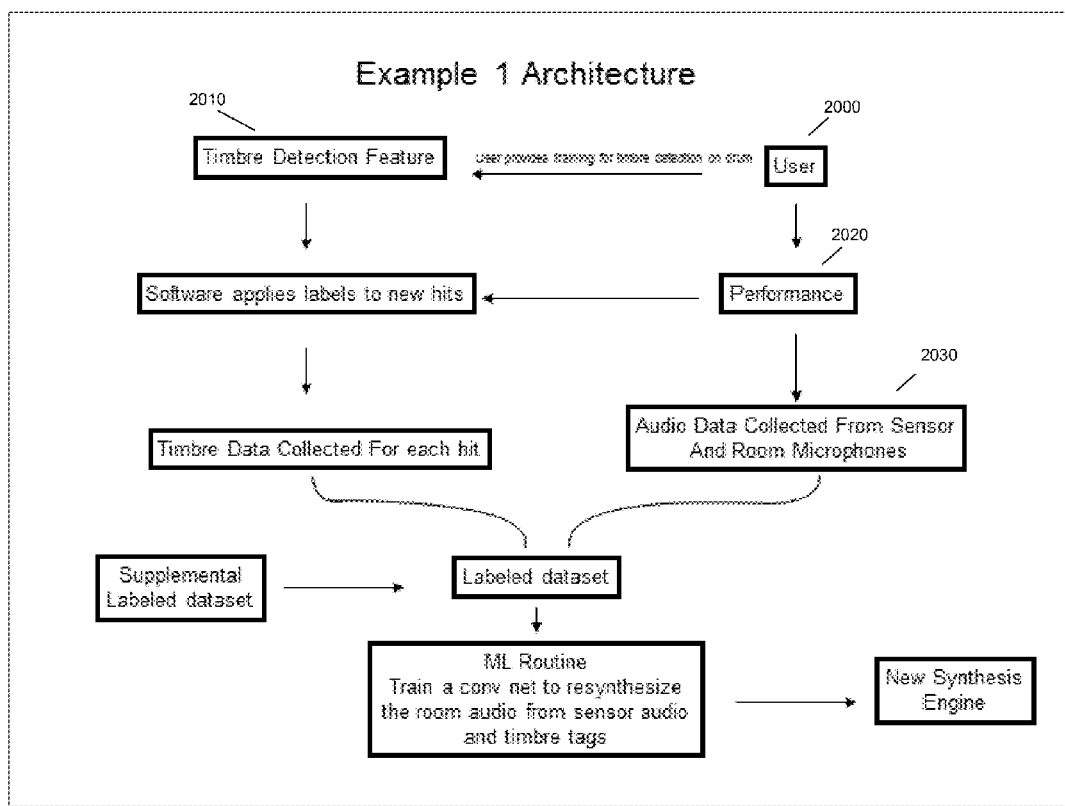

FIG. 25 shows a variation on the architecture shown in FIG. 24.

As shown, by utilizing timbral data, the system disclosed may be applied to any given acoustic drum (i.e. snare, foot tom, bass drum) and trained to accurately recognize different drum strokes associated with the practice of drumming. As shown, the user 2000 may set a timbral detection feature 2010 within the system and may then perform 2020 while recording the acoustic response of the instrument in a recording studio using traditional microphones to obtain high-quality recordings of the drum 2030. The timbral recognition data may then be utilized to edit, organize and integrate the studio recorded audio of the instrument into the system's internal sampler engine so that the acoustic sounds of the drum may then be mapped to timbral qualities of the drum stroke that originally created the corresponding. These sounds may then be used to recreate that acoustic instrument's sound on a different drum, thus creating a virtual "copy" of the instrument.

Further, by mapping audio samples to timbral qualities of drum strokes, the audio samples may be usable across a variety of drum kits. Accordingly, studio recorded audio, or other samples, may be applied during playback or in the context of a recording, on any drum kit based on corresponding timbre recognition. A user of a drum kit would therefore not be limited to samples generated by the kit being used at any given time. In some embodiments, the system described may be provided with a variety of sample banks that would support the interchangability of drum playback based on corresponding timbre and/or velocity data. Further, in some embodiments, the system may record a drum performance in terms of the timbre data, or may apply the methods described to a recorded performance, such that the audio from the drum performance may be replaced with samples from the sample library.

Alternatively, these same recordings and associated timbral data may be used in conjunction with machine learning techniques, such as deep convolutional neural nets, to resynthesizing the sound of the original acoustic instrument in response to the timbral/gestural input of another drum used with the system. The data collected while recording the acoustic response of the drum may be used as target ground truth data in the learning algorithm, so that by supplying the timbral data to the learned algorithm, the acoustic sound may be resynthesized and played as a virtual version of the original instrument.

Figure 26:
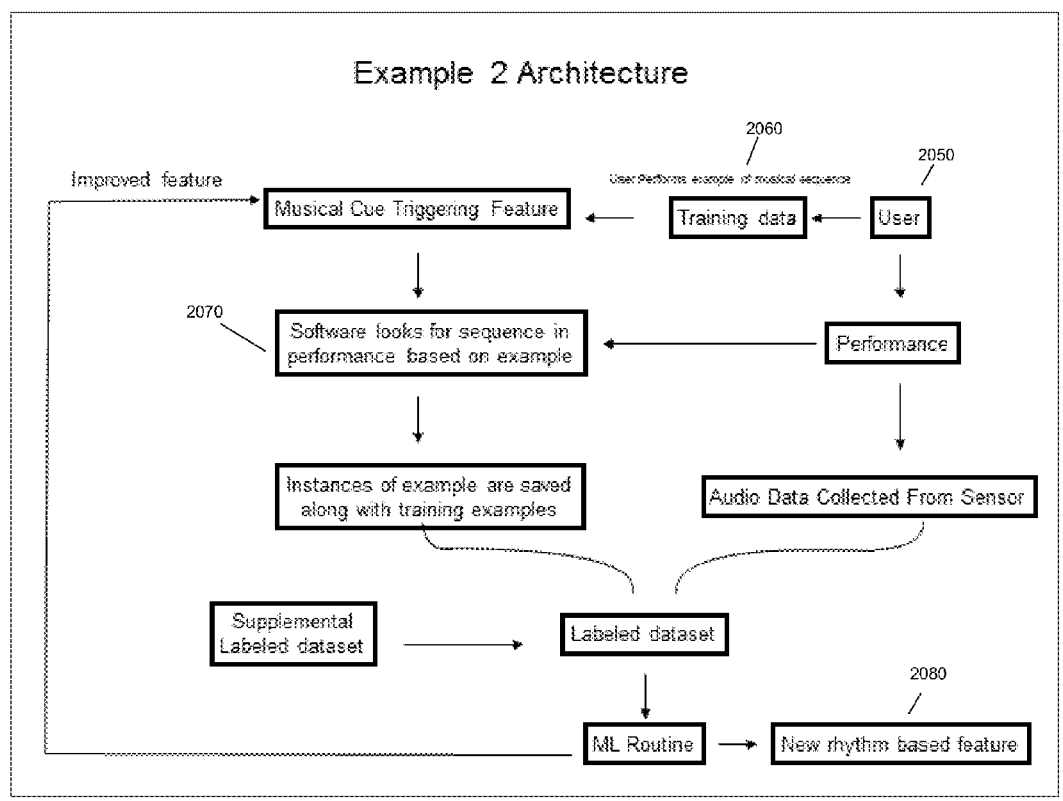

FIG. 26 shows a user training the system to recognize particular features in a rhythm. Such rhythm detection piggybacks off of user provided ground truth data.

Accordingly, the system will allow a user to create a musical sequence that can be used to trigger an event or apply a variable parameter control, or some other type of control, over some aspect of the software. Through a software user-interface the user will first 2050 indicate to the software what feature they are about to demonstrate and then provide the software with a musical example of a segment of a performance (2060) (e.g. a combination of hits over time on different drums that creates a recognizable rhythm). The software will then analyze the performance and identify the indicated sequence (2070) and record it as an example of the indicated sequence. The system will then monitor future performances for segments that approximate or match exactly the example. Upon recognition of such a segment, the software will execute some task that has been pre-assigned by the user (2080).

Any method of rhythm recognition may be applied here, such as a tempogram analysis over the example given, a multi-band tempogram analysis time-series analysis as with Markov Chain analysis. By inviting the user to provide this type of hand-labeled data to the software, a corpus of rhythm-specific labeled data may be gathered and used to further improve such detection as well as to build larger computational models of rhythm and performance.

A tempogram analysis is an analysis in which a multi-band frequency analysis is applied over a time window that allows low frequency resolution on the order of common musical beat-per-minute ranges (60-300 beats per minute). This approach abstracts rhythms over time to a frequency-decomposed presentation and allows for rhythms to be embedded in a feature space wherein distances between features can be measured.

Figure 27:
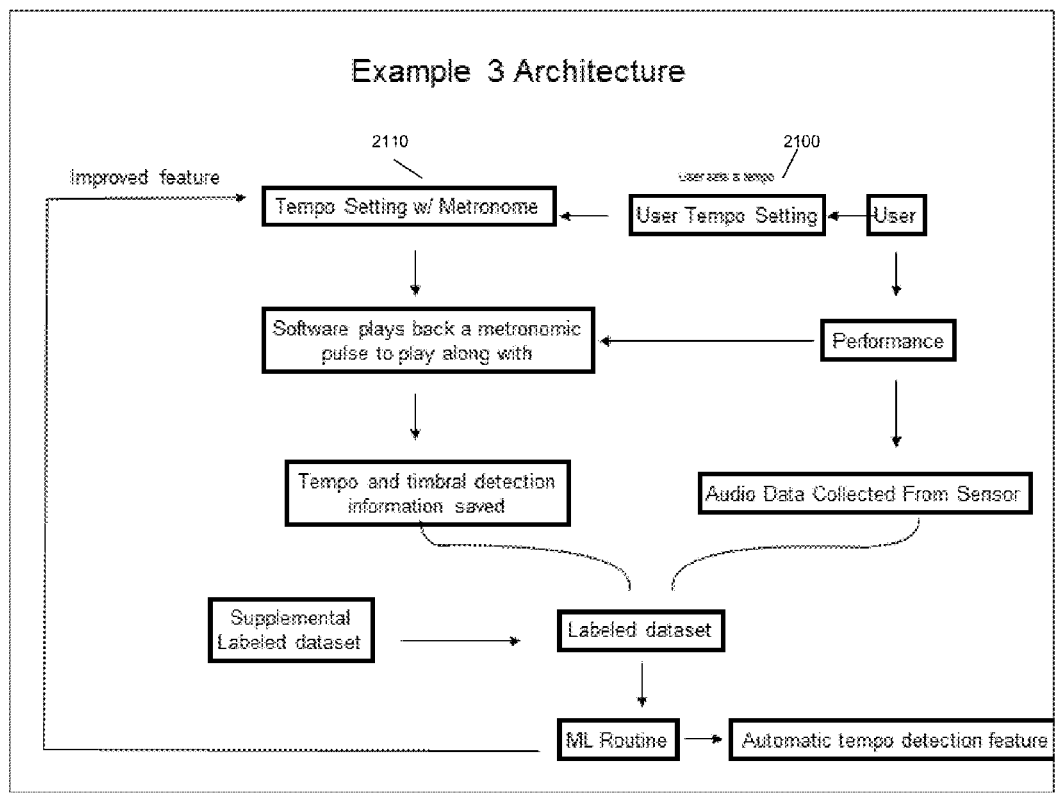

FIG. 27 shows a user training a system to detect tempo of a performance. Just as in the context of FIG. 26, a user may program the system with ground truth tempo data in order to improve and increase the robustness of the system's automatic tempo detection from natural performances. An interface for the system may allow a user to incorporate "hand labeled," or explicitly defined, data that may be used as ground truth annotation to data collected during performance. Two examples of these types of features may be a tempo setting that can be set by a user (2100) that controls a metronome (2110) that can be played along with. Alternatively, the system may include a tempo feature on a delay/echo effect that effectively sets a performance tempo. By providing the user with a tempo setting, if the user decides to set a tempo and play along with a metronome all data collected during this period may be used in conjunction with the tempo as ground truth data towards creating robust automatic tempo detection without the user having to input a tempo marking. The system will then learn how to follow the musician's tempo during performance which will enable a host of new features in the software, such as automatic time-stretching of audio that can be matched to the tempo of the performer.

Sound Mapping:

After training, through the use of the GUI the user can "map" samples, synthesizers, effects, or any generic controls (such as MIDI), to be associated with note onset events related to the regions in a classification model. Further, control parameters can be mapped to relate distances between regions or other parameters of drum performance such as velocity or speed. An example of a control parameter might be continuous control messages of the MIDI protocol, e.g. the full distance range from class A to class B with a point P classified as A will identify a value on that range, which can be used as a generic continuous control value. When the user plays the acoustic instrument, an event is detected, the event is analyzed and classified and will then trigger its associated sound or control output. Another example of the translation of this data space to sound output is an option to blend or morph between two sounds associated with different regions in the data space. If one plays the instrument in such a way that each new data point moves progressively between two classes in the data space (e.g. beginning by striking the center of the drum and then striking the drum while progressively moving outward toward the edge will produce data points that begin very close to the class associated with the center of the drum and move progressively closer the class associated with the edge of the drum), the digital sounds associated with these two regions can be smoothly and progressively blended and output as audio through a speaker to correspond to the way the instrument is being played.

Extracting a continuous control value that relates a new data point to the class centers in the model's data space can be incorporated into the models discussed above with respect to FIGS. 21-23. In such an embodiment, a user may request a control value that identifies two classes as start and end points for the range of the control, say class A and class B, such as those shown in FIG. 21. Given a new data point 1600, the distance between data point P (1600) and the center of cluster A and data point P (1600) and the center of cluster B is calculated. A value between 0 and 1 is then calculated as follows: Value=dist(A,P)/(dist(A,P)+dist(B,P)) where dist is an n-dimensional Euclidean distance measure. This value can then be used to control any continuous parameter within the system or sent out to control an external parameter. An example of this is to control a variable parameter like a parameter in a digital effect unit such as reverb. Further low-pass filtering can be applied to the movement of these values as the drum is struck so as to achieve the effect of a knob being twisted continuously.

This value can also be used to create fuzzy classifications, where a new data point may be closer to one class than another but these relative distances are retained for controlling the relative volumes of two audio samples during playback. This will have the effect of a continuous aural movement in the digital output that relates directly to the continuous timbre movement of striking the drum repeatedly while progressing from one region to another. Similarly, other continuous control parameters may be extracted from other features of the data. For example, the velocity of a drum hit may be extracted from the force of a hit or the volume of the result of the hit, and the speed of a drum roll may be extracted from the distance between successive hits.

Figure 28:
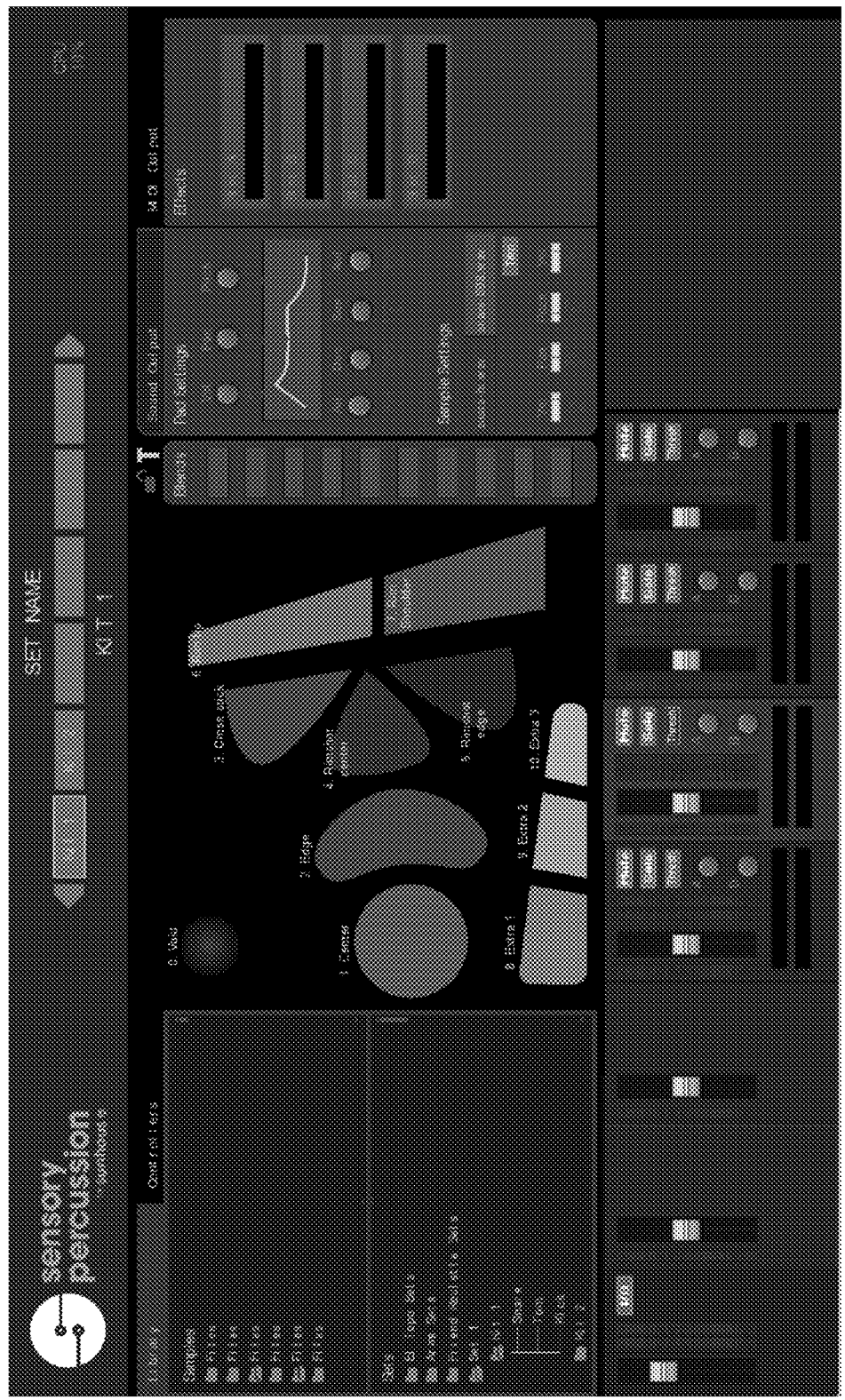
FIGS. 28-29 illustrate an exemplary graphical user interface for implementing the systems and methods described.
Figure 29:
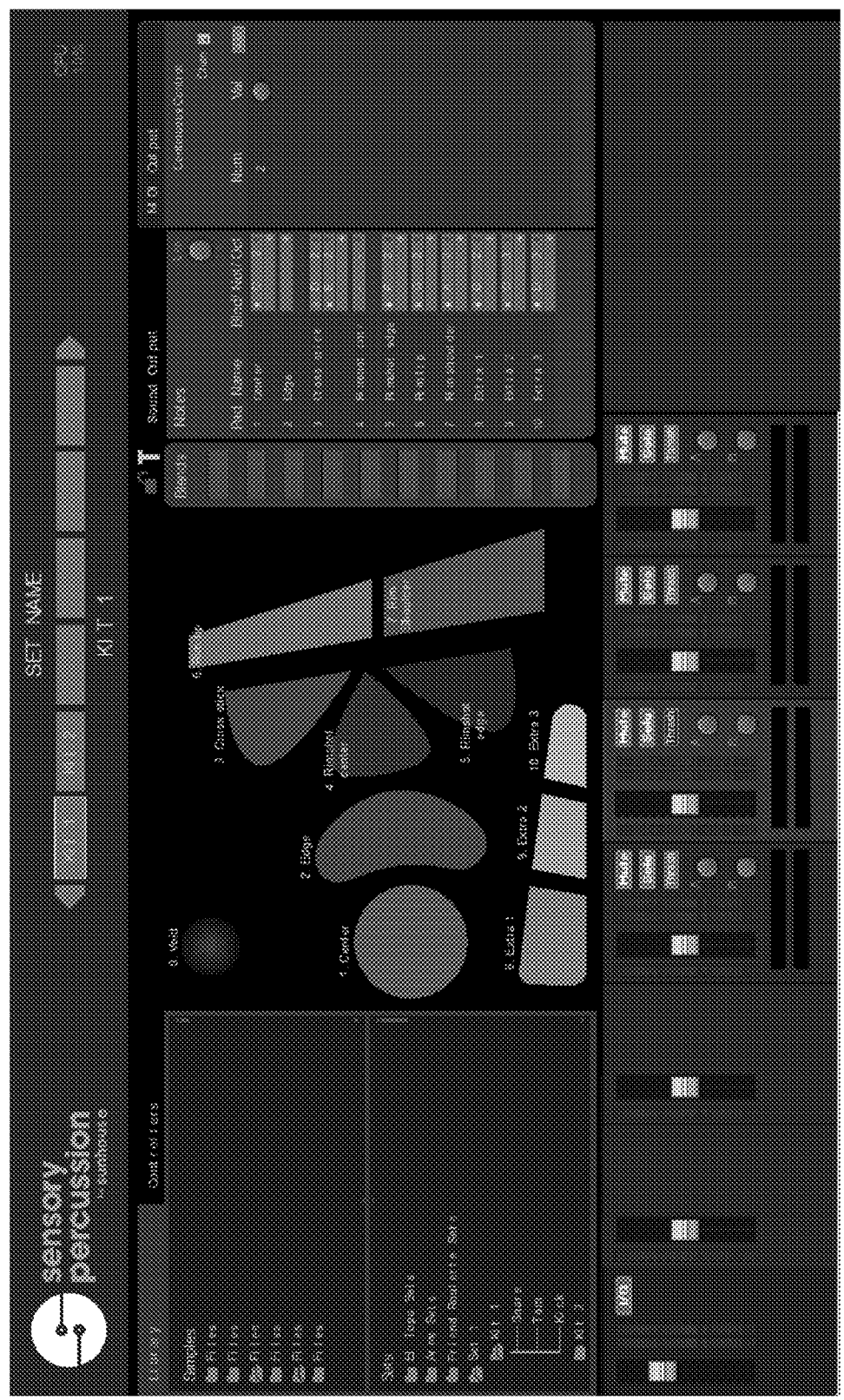

Graphical User Interface (GUI):

As shown in FIGS. 28 and 29, the graphical user interface has a representation of different sonic regions of a drum, a mixer to control individual channel volume, a sample browser, an effect controller creation panel, an effect panel with digital audio effect including reverb and delay, a sample editor/and drum synth parameter window, an onset detection parameter interface and a panel for selecting blend options between pad sounds.

The representation of different sonic regions of a drum shows several pads, each of which correspond to either a region of an acoustic drum, a stroke that can be used to play an acoustic drum or a specific way of striking the drum with a drum stick. Pads include, Center, Edge, Rimshot Center, Rimshot Edge, Crossstick, RimTip, RimShoulder, as well as extra pads for customizability and pads for the strike bar that sits on top of the hardware microphone.

The pads are arranged as a pie slice of a drum with the center being at the tip of the slice and the rim pads being at the edges.

The pads are selectable with a mouse click for both training mode and playing mode. In training mode, you select the pad to be trained. In playing mode, selecting a pad brings up contextual panels that show samples and effects that have been applied to the pad. Samples, effects, and synth can be assigned to a given by dragging and dropping either from the sample library, the effects rack or the synth rack.

As the user hits the drum, the corresponding pad will light up, indicating to the user that the system is recognizing the strike and correctly labeling it. If a blend has been set between two pads, you will see both pads light up as the drum is struck near the regions associated with those pads, showing varying light intensity depending on the relative values of each pad in that blend calculation.

The effect controller creation panel allows the user to create an effect controller that can use a variable method of striking the drum as a source (i.e. distance from center to edge as calculated in the geometric interpretation engine, force of strike, speed of successive strikes) and can then be applied to control any variable setting within the software. This will allow the user to control an effect like reverb decay by hitting the drum in particular places or by hitting the drum with varying volume or by hitting the drum quickly or slowly. These drumming elements are translated to continuous control values that are updated upon each strike of the drum.

The onset detection parameter interface allows the user to view the Onset Function in real time and adjust the threshold parameter as well as the adaptive window parameter (W3) interactively. Strikes of the drum appear as peaks in a function plotted on the screen. This function scrolls to the left as time passes. Peaks that are identified as events are marked with a blue line. Threshold is set by moving a horizontal line up or down. Peaks that remain under the horizontal threshold line will be ignored while peaks that exceed the threshold line will be marked as onsets. The adaptive threshold window is a rectangular box that can be extended to the right. Moving the corner of the rectangle to the right increases the adaptive threshold time window.

Figure 30:
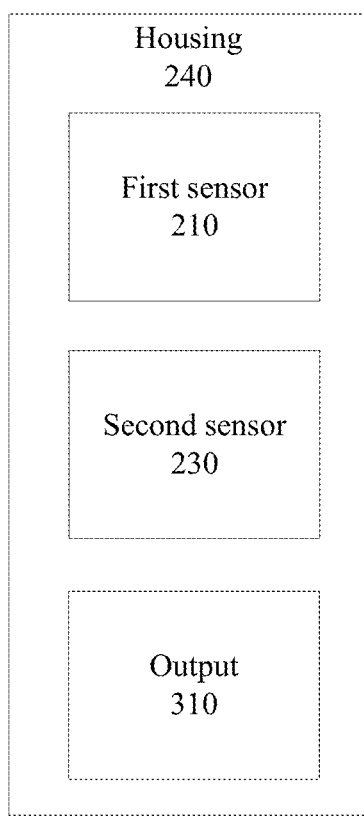
FIG. 30 is a schematic diagram illustrating the device of FIG. 1.

FIG. 30 is a schematic diagram illustrating a first embodiment of the device of FIG. 1, such as that shown in FIGS. 2-9. As shown, the device 100 may have a housing 240, and the housing may contain a first sensor 210, a second sensor 230, and an output 310. The first sensor 210 is typically fixed against a surface of an object being captured by the device 100 and the second sensor 230 is typically not in contact with the object being captured, but rather is fixed in some position relative to the object. Vibrations captured by the first sensor 210 and the second sensor 230 may be combined by on board circuitry and then output at 310, or they may be output directly and then mixed externally to the device.

While the sensors are shown within a housing 240, the sensors may also be applied directly to surfaces, or may be suspended above drum heads or other instruments using separate stands. For example, the first sensor 210 may be stuck to the rim of a drum using a sticker. The sensors would then transmit data to a processor through a separate interface, which may be wired or wireless, where the data would then be interpreted.

Figure 31:
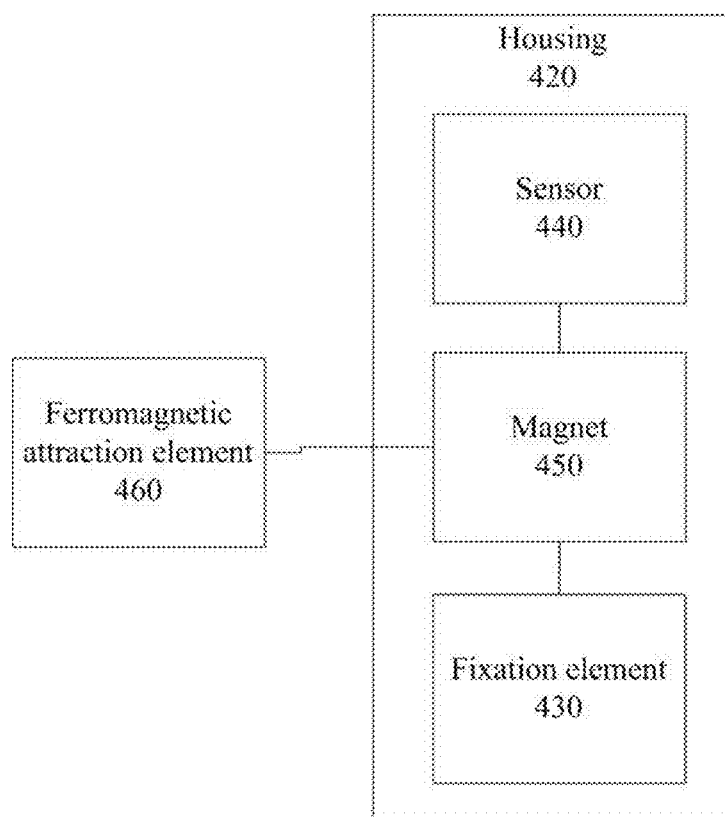
FIG. 31 is a schematic diagram illustrating the device of FIG. 11.

FIG. 31 is a schematic diagram illustrating an alternative embodiment of the device of FIG. 1, such as that shown in FIGS. 11-14. As shown, the device 400 may have a housing 420, and the housing may contain a sensor 440, a magnet 450, and a fixation element 430. A ferromagnetic attraction element 460 may be included outside of the housing 420, and may separately interact with the magnet 450 as discussed in more detail above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" and like terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwith-

What is claimed is:

1. A device for capturing vibrations produced by an object, the device comprising:
a fixation element for fixing the device to an object;
a sensor spaced apart from a surface of the object and located relative to the object; and
a magnet adjacent the sensor;
wherein the fixation element is configured to transmit vibrations from a fixation point on the object to the magnet,
wherein the magnet is configured to transmit vibrations from the fixation point and vibrations from a surface of the object to the sensor, and
wherein the sensor is a coil inductor.

2. The device of claim 1 wherein the object is a musical instrument.

3. The device of claim 2 wherein the object is a drum and wherein a ferromagnetic attraction element is located on a drum head.

4. The device of claim 3 wherein the fixation element transmits vibrations from a drum rim to the sensor.

5. The device of claim 3 wherein the sensor detects a response of the magnet to vibrations of the ferromagnetic attraction element on the drum head.

6. The device of claim 3 wherein the ferromagnetic attraction element is a metallic shim.

7. The device of claim 1, wherein the fixation element fixes the device to a drum and transmits vibrations to the magnet along a direction substantially parallel to a drum head membrane.

8. A system for capturing vibrations produced by an object, the system comprising:
a ferromagnetic attraction element located on a surface of the object;
a sensor located adjacent to but not touching the ferromagnetic attraction element or the surface of the object;
a fixation element for fixing the sensor relative to the object and for transmitting vibrations from a fixation point on the object to a magnet adjacent the sensor;
wherein the ferromagnetic attraction element perturbs a magnetic field of the magnet when vibrated; and
wherein the magnet transmits vibrations from both the fixation point and the ferromagnetic attraction element to the first sensor.

9. The system of claim 8 further comprising a processor for identifying an audio event based on signals captured at the first sensor.

10. The system of claim 9 further comprising an audio output for outputting a sound based on the audio event identified by the processor.

11. A method for extracting audio from electrical signals within a data processing device, the method comprising:
receiving, at the data processing device, a stream of audio input data;
identifying, in the audio input data, at least one audio event;
generating, by the data processing device, an n-dimensional representation of the audio event, wherein at least one of n dimensions of the n-dimensional representation corresponds to a timbre characteristic;
classifying the audio event by comparing the timbre characteristic of the audio event to expected representations of a plurality of audio events.

12. The method of claim 11 further comprising identifying, in the audio input data, an onset of the audio event and selecting a discrete analysis window from the audio data based on the location of the onset of the audio event in the audio data, and wherein the n-dimensional representation is generated by evaluating the contents of the discrete analysis window.

13. The method of claim 11 wherein the n-dimensional representation is compared geometrically to a plurality of audio zones defined by expected signal parameters in the timbre characteristic and at least an additional one of the n dimensions and associated with a sample audio event, and wherein when the n-dimensional representation is within one of the audio zones, the audio event is classified in accordance with the corresponding audio zone.

14. The method of claim 11 further comprising:
identifying a plurality of audio events;
generating an n-dimensional representation corresponding to each of the plurality of audio events, wherein at least one of the n dimensions of each representation corresponds to a timbre characteristic; and
identifying a pattern by evaluating the plurality of audio events.

15. The method of claim 14 further comprising:
identifying a subset of audio events of the plurality of audio events that are related based on their corresponding timbre characteristic; and
identifying a pattern by evaluating only related audio events.

16. The method of claim 14 wherein the patterns identified represent a tempo of the plurality of audio events.

17. The method of claim 16 further comprising applying a delay, echo, or time-stretching effect to an audio output associated with the plurality of audio events.

18. The method of claim 14 further comprising:
identifying, at a user interface, at least one expected pattern; and
recording, at a memory, a grouping of the n-dimensional representations corresponding to the plurality of audio events as an example of the at least one expected pattern.

19. The method of claim 14 further comprising:
determining if the identified pattern corresponds to one of a plurality of expected trigger patterns; and
triggering an output event corresponding to the trigger pattern where the identified pattern corresponds to an expected trigger pattern.

20. The method of claim 11 further comprising recording, at a memory, the n-dimensional representation as an expected representation of the audio event.

21. The method of claim 20 further comprising;
identifying, at a user interface, an expected audio event in the stream of audio input data;
confirming that the audio event corresponds to the expected audio event prior to recording, at a memory, the n-dimensional representation.

22. The method of claim 11 further comprising:
receiving, at the data processing device, a stream of audio output data;
identifying, in the audio input data, an output event corresponding to the audio event in the audio output data; and
recording, at a memory, the output event as a sample output that may be associated with the identified audio event.

* * * * *